(12) United States Patent
Kean et al.

(10) Patent No.: US 11,512,453 B2
(45) Date of Patent: *Nov. 29, 2022

(54) MACHINE STABILITY DETECTION AND CONTROL

(71) Applicant: Deere & Company, Moline, IL (US)

(72) Inventors: Michael G. Kean, Maquoketa, IA (US); Mark J. Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/930,656

(22) Filed: Jul. 16, 2020

(65) Prior Publication Data
US 2020/0347578 A1    Nov. 5, 2020

Related U.S. Application Data

(63) Continuation of application No. 16/048,966, filed on Jul. 30, 2018, now Pat. No. 10,767,348.

(51) Int. Cl.
*E02F 9/26* (2006.01)
*E02F 9/20* (2006.01)
(Continued)

(52) U.S. Cl.
CPC ............ *E02F 9/262* (2013.01); *E02F 9/2033* (2013.01); *E02F 9/24* (2013.01); *B60W 30/04* (2013.01);
(Continued)

(58) Field of Classification Search
CPC ........... E02F 9/262; E02F 9/2033; E02F 9/24; B60W 30/04; B60W 2530/10;
(Continued)

(56) References Cited

U.S. PATENT DOCUMENTS 3,735,876 A * 5/1973 Brownell ................ B66C 23/90
                                                    212/277
5,701,691 A * 12/1997 Watanabe ............... E02F 3/435
                                                    701/50
(Continued)

FOREIGN PATENT DOCUMENTS

WO   WO-2015186179 A1 * 12/2015   ................ E02F 3/32
WO      2017076390        5/2017

OTHER PUBLICATIONS

U.S. Appl. No. 16/048,966, filed Jul. 30, 2018 Prosecution History as of Feb. 5, 2020, 94 pages.

*Primary Examiner* — Frederick M Brushaber
(74) *Attorney, Agent, or Firm* — Joseph R. Kelly; Kelly, Holt & Christenson PLLC

(57) ABSTRACT

A mobile work machine includes a frame; ground engaging elements movably supported by the frame and driven by a power source to drive movement of the machine; a moveable element movably supported by the frame to move relative to the frame; an actuator coupled to the moveable element to controllably drive movement of the moveable element; a control system that generates an actuator control signal, indicative of a commanded movement of the actuator, and provides the actuator control signal to the actuator to control the actuator to perform the commanded movement; a terrain identifier configured to identify a characteristic of terrain in a geographic area around the machine; and a stability system that determines whether the commanded movement will result in an unstable state of the machine based on the characteristic of the terrain and, if so, generates a restriction signal, restricting the commanded movement to avoid the unstable state.

20 Claims, 10 Drawing Sheets

(51) Int. Cl.
  *E02F 9/24*    (2006.01)
  *B60W 30/04*   (2006.01)
  *B60W 10/30*   (2006.01)
  *B60W 50/08*   (2020.01)
  *B60W 60/00*   (2020.01)

(52) U.S. Cl.
  CPC ..... *B60W 2530/10* (2013.01); *B60W 2555/00* (2020.02)

(58) Field of Classification Search
  CPC ............. B60W 2555/00; B60W 10/30; B60W 2510/30; B60W 2520/10; B60W 2520/12; B60W 50/08; B60W 50/085; B60W 60/00; B60W 60/007; B60W 2552/00; G01M 1/122; G01D 21/02; G05B 15/02
  See application file for complete search history.

(56) References Cited

U.S. PATENT DOCUMENTS

| | | | |
|---|---|---|---|
| 8,605,947 B2 | 12/2013 | Zhang et al. | |
| 9,080,317 B2 | 7/2015 | Matsuyama | |
| 9,389,615 B2 | 7/2016 | Webber et al. | |
| 10,017,913 B2 | 7/2018 | Iwamura | |
| 10,106,951 B2 | 10/2018 | Myers | |
| 10,106,952 B2 | 10/2018 | Iwamura | |
| 10,119,250 B2 | 11/2018 | Iwamura | |
| 2005/0027420 A1* | 2/2005 | Fujishima | E02F 9/2045 701/50 |
| 2008/0208416 A1* | 8/2008 | Yuet | B60W 30/04 340/440 |
| 2012/0232763 A1* | 9/2012 | Mizuochi | E02F 9/264 701/50 |
| 2015/0045992 A1 | 2/2015 | Ashby et al. | |
| 2015/0345114 A1* | 12/2015 | Nomura | G01S 19/43 37/379 |
| 2016/0312434 A1* | 10/2016 | Shintani | E02F 3/3681 |
| 2017/0130429 A1* | 5/2017 | Lafrenier | B66F 17/003 |
| 2017/0249844 A1 | 8/2017 | Perkins et al. | |
| 2018/0002899 A1* | 1/2018 | Morimoto | E02F 9/264 |
| 2019/0028676 A1* | 1/2019 | Koga | B64D 47/08 |
| 2020/0032488 A1* | 1/2020 | Kean | B60W 50/08 |

\* cited by examiner

MACHINE STABILITY DETECTION AND CONTROL

CROSS-REFERENCE TO RELATED APPLICATION

The present application is a continuation of and claims priority of U.S. patent application Ser. No. 16/048,966, filed Jul. 30, 2018, the content of which is hereby incorporated by reference in its entirety.

FIELD OF THE DESCRIPTION

The present description generally relates to the use of a wide variety of different vehicles in performing operations at a worksite. More specifically, the present description relates to the use of computing systems in improving stability prediction for control applications at a worksite.

BACKGROUND

There are a wide variety of different types of equipment including forestry equipment, construction equipment, and agricultural equipment. These types of equipment often have many different mechanisms that can be controlled, at least to some extent, by an operator. Some of these mechanisms include mechanisms that are mechanical, electrical, hydraulic, pneumatic, and electromechanical, among others.

These types of equipment also have sensors for communicating sensor information. The sensor information is often used in a reactive way, so machines might experience difficulty when attempting to avoid hazardous conditions at a worksite.

These types of machines often operate in relatively rugged physical terrain. They can operate on relatively steep grades, where the surface is uneven or has obstacles, such as tree stumps or rocks. Thus, some machine can become unstable end even tip over or roll. The vast number of unique combinations of control over the different mechanisms also presents many challenges when trying to enhance machine stability.

The discussion above is merely provided for general background information and is not intended to be used as an aid in determining the scope of the claimed subject matter.

SUMMARY

A mobile work machine includes a frame, a set of ground engaging elements movably supported by the frame and driven by a power source to drive movement of the mobile work machine, a moveable element movably supported by the frame to move relative to the frame and an actuator coupled to the moveable element to controllably drive movement of the moveable element. The mobile work machine also includes a control system that generates an actuator control signal, indicative of a commanded movement of the actuator, and provides the actuator control signal to the actuator to control the actuator to perform the commanded movement. Further, the mobile work machine includes a terrain identifier configured to identify a characteristic of terrain in a geographic area around the mobile work machine and a stability system, coupled to the control system, that determines whether the commanded movement will result in an unstable state of the mobile work machine based on the identified characteristic of the terrain in the geographic area around the mobile work machine and, if so, generates a restriction signal, restricting the commanded movement to avoid the unstable state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A wide variety of different operations can be performed at a jobsite. Some example operations include using a mobile machine in planting a material, harvesting a planted material (such as a crop or trees), cutting a harvested material, spraying a material, tilling a ground surface, among others. Many such operations utilize machinery that can perform a variety of functions. Jobsite machines (referred to herein as a machine and a mobile machine) often have a wide variety of sensors that sense a variety of different variables such as machine operating parameters, worksite characteristics, environmental parameters, etc. Sensor signals are communicated over a controller area network (CAN) bus (or another network, such as an Ethernet network, WiFi etc.) to various systems on the machine that process the sensed variables to generate output signals (such as control signals or other outputs) based on the sensed variables. Some typical systems might use sensor information to understand past operations or to react to sensed variables. Often, they do not use sensor information to understand the impact of likely operations, before they occur.

Many machines are at risk of encountering hazards during an operation. One type of hazard occurs when a machine becomes unstable and tips over. Machines are often damaged when they tip over. It is costly and time-consuming to upright a tipped machine and fix any damage before continuing an operation.

Figure 1:
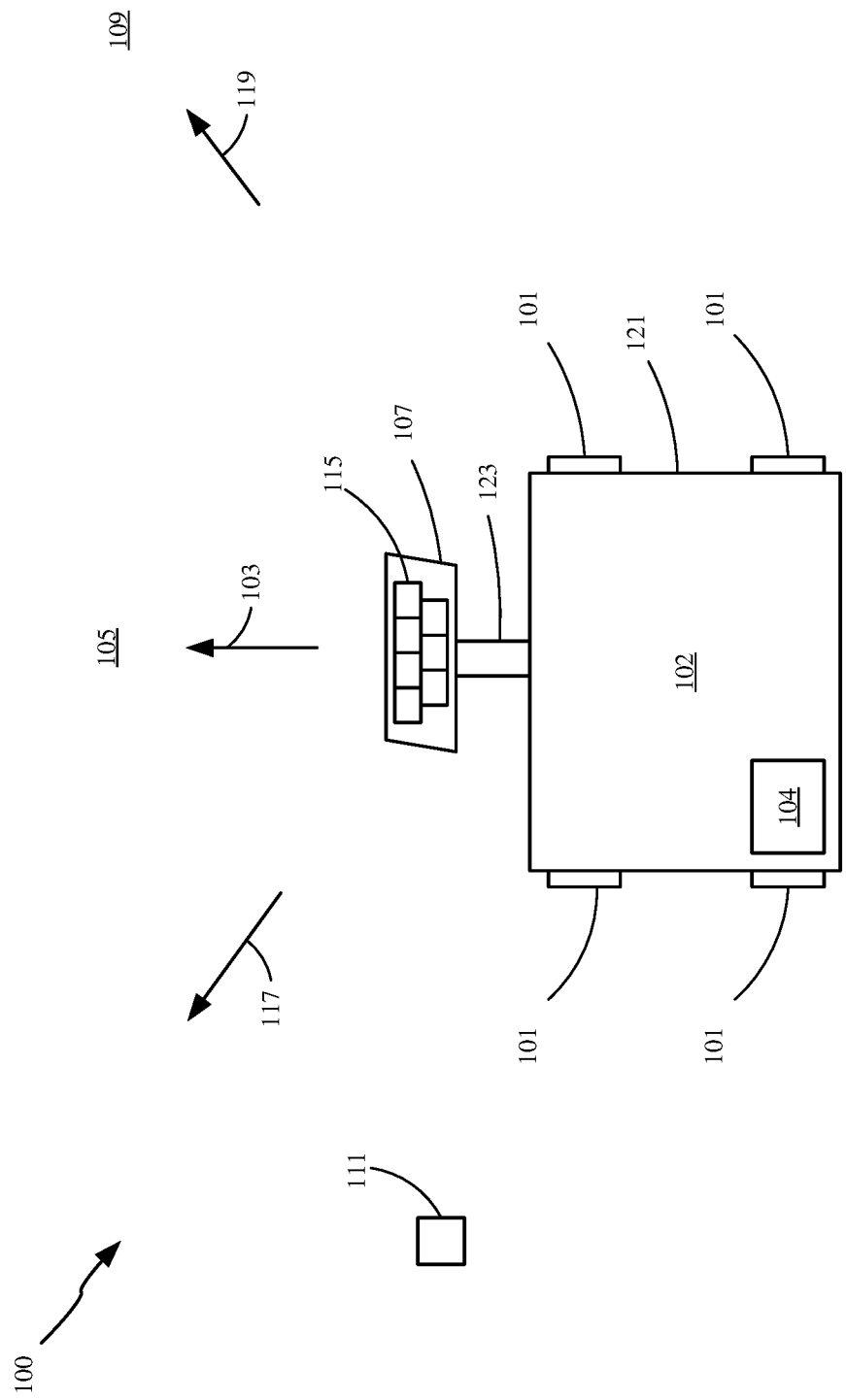
FIG. 1 is a pictorial illustration of a jobsite using a stability detection and control system.

FIG. 1 is a pictorial illustration of a jobsite 100 including a mobile work machine 102 using a stability detection and control system 104. FIG. 1 shows that mobile work machine 102 (referred to hereinafter as "machine 102") is controlled to perform an operation at jobsite 100. Machine 102 includes a set of ground engaging elements 101 (e.g., wheels or other ground-engaging elements such as tracks, etc.) that are movably supported by a frame 121 and driven by an engine to drive movement of machine 102. In the illustrated example, ground engaging elements 101 contact a ground surface 105 to drive movement of machine 102 in a direction generally indicated by arrow 103.

Machine 102 also includes a movable element 107. Movable element 107 is movably supported by frame 121 to move relative to frame 121. An actuator 123 is coupled to movable element 107 and controllably drives movement of movable element 107 to different positions relative to frame 121. Movable element 107 can be a wide variety of different attachable elements such as a bucket, a boom, or a grapple, among others. In the example illustrated in FIG. 1, movable element 107 holds a material 115. For example, movable element 107 may be a grapple or bucket that holds tree stems, soil, rocks, or other materials 115.

FIG. 1 illustratively shows machine 102 at a given instant of operation at jobsite 100. At the position shown in FIG. 1, machine 102 is in a stable state. It has a static stability that is determined based on a center of gravity of machine 102 at the given instant, a net load on machine 102, the orientation of machine 102 relative to ground surface 105, a height of ground engaging elements 101 as they contact ground surface 105, and a slope of ground surface 105 among a wide variety of other information. The center of gravity of machine 102 can be determined based on a position of movable element 107 relative to frame 121, and a weight of material 115 in movable element 107, among a variety of other information corresponding to a static stability of machine 102. Machine 102 also has a dynamic stability. The dynamic stability of machine 102 is determined by taking into consideration not only the static stability information (e.g., center of gravity, orientation, slope, etc.), but also an understanding of how loads applied to machine 102 relating to accelerations experienced as a result of a change in the state of machine 102 affect stability. For instance, rapid changes to the state of machine 102 produce accelerations that, in turn, cause varying loads to be applied to machine 102. In the illustrated example, machine 102 might remain in a stable state if it continues to travel in the direction generally indicated by arrow 103. However, because machine 102 is often rapidly controlled to adjust operating characteristics, determining a static stability of machine 102 does not necessarily provide a forewarning of a potential unstable state.

For example, as shown in FIG. 1, machine 102 can be controlled to travel in the direction generally indicated by arrow 117. An object 111 is shown positioned along the direction of travel indicated by arrow 117 and is raised some height relative to ground surface 105. For instance, object 111 may be a rock, a tree stump, or other object. One or more of ground engaging elements 101 might contact object 111 and be raised some height above the other ground engaging elements 101, which remain in contact with ground surface 105. This change in contact height can change the center of gravity of machine 102 such that machine 102 is unstable.

Determining whether machine 102 is stable can take a wide variety of different forms. For instance, if the center of gravity of machine 102 is outside a particular perimeter, then it may be determined that machine 102 is unstable. If the center of gravity is inside that perimeter, then it may be determined that machine 102 is stable. As one example, when the center of gravity of machine 102, projected along the direction of the net load acting upon machine 102, passes outside a perimeter defined by the contact locations of ground engaging elements 101 with ground surface 105, then it may be determined that machine 102 is unstable. When the center of gravity of machine 102, projected along the direction of the net load acting upon machine 102, passes inside that perimeter (the contact locations of ground engaging elements 101 with ground surface 105), then it may be determined that machine 102 is stable. This is just one example, and others can be used.

In another example illustrated in FIG. 1, machine 102 might be controlled to travel in the direction generally indicated by arrow 119. If machine 102 travels in the direction generally indicated by arrow 119, machine 102 will encounter area 109 which may have a large slope angle. That is, area 109 has a relatively steep slope compared to the other areas of ground surface 105 surrounding machine 102. If one or more ground engaging elements 101 were to travel over area 109, the center of gravity of machine 102 and the orientation of machine 102 relative to ground surface 105 can change such that machine 102 is unstable. Further, for example, machine 102 can be rapidly controlled to change a position of movable element 107. When movable element 107 is positioned on a first side of frame 121, adjacent higher ground (or that is on an uphill side of machine 102), machine 102 might have a center of gravity that renders it stable. However, if movable element 107 is controllably moved to a second side of frame 121 that is adjacent lower ground (or that is on a downhill side of machine 102), machine 102 might have a center of gravity that renders it unstable. Further, for example, as machine 102 moves element 107 from the first side of frame 121 to the second side, it may rapidly control a stopping of the motion of element 107 which will generate a dynamic load on machine 102. The dynamic load may render machine 102 unstable even when machine 102 is stable in the absence of the dynamic load.

As such, machine 102 can be rapidly controlled to adjust travel speed, steering angle, orientation, a position of one or more movable elements 107, positions of other linkages, a load carried by machine 102, among other controllable adjustments. These various types of adjustments can be controlled automatically, semi-automatically, or manually, for example by the use of vehicle automation systems or in response to operator actuation of control mechanisms. These types of adjustments are often performed rapidly during an operation. When a machine is rapidly controlled, the center of gravity of the machine can also rapidly change.

As discussed in further detail below, stability detection and control system 104 is implemented with machine 102 to predict controllable adjustments during an operation. It performs various analyses on the predicted adjustments to detect scenarios that are likely to occur and that are likely to render machine 102 unstable. To do so, stability detection and control system 104 predicts positions to which machine 102 might travel. Stability detection and control system 104 also predicts configurations of machine 102 at each of the predicted positions. For example, it predicts that movable element 107 will be controllably positioned at some angle relative to frame 121 when machine 102 is located at a particular one of the predicted positions. Stability detection and control system 104 also predicts a likely orientation of machine 102 relative to a detected slope. Using this information, stability detection and control system 104 calculates a likely center of gravity of machine 102 at each of the predicted positions (the positions that machine 102 may be likely to occupy in the near future) across jobsite 100. It generates a measure of probability that machine 102 will have a likely center of gravity that renders the machine in an unstable state and implements dynamic control applications to avoid the unstable state.

For instance, assume that system 104 determines that it is highly likely that the operator of machine 102 will turn to the right (in the direction indicated by arrow 119) and begin heading downhill over area 109. Assume further that system 104 determines that the operator is likely to have movable element 107 raised high and carrying a heavy load. Under these conditions, it may be that system 104 predicts that machine 102 is likely to become unstable. In that case, stability detection and control system 104 can restrict control of machine 102 to prevent a configuration that orients machine 102, relative to the slope, such that the load causes the center of gravity of machine 102 to be unstable. For example, it can restrict the height of movable element 107 so it cannot be raised above a certain height, to maintain stability. It may restrict the turning angle of machine 102 so it cannot encounter the steepest part of the slope. It can control machine 102 in other ways as well to maintain stability.

Stability detection and control system 104 can also generate a measure indicative of a likelihood of encountering an unstable state at each of the predicted positions. This provides a robust stability control system that strategically restricts control to avoid unstable states during an operation. As such, stability detection and control system 104 prevents hazards situations where machine 102 tips over, before they occur, thereby improving performance.

Figure 2:
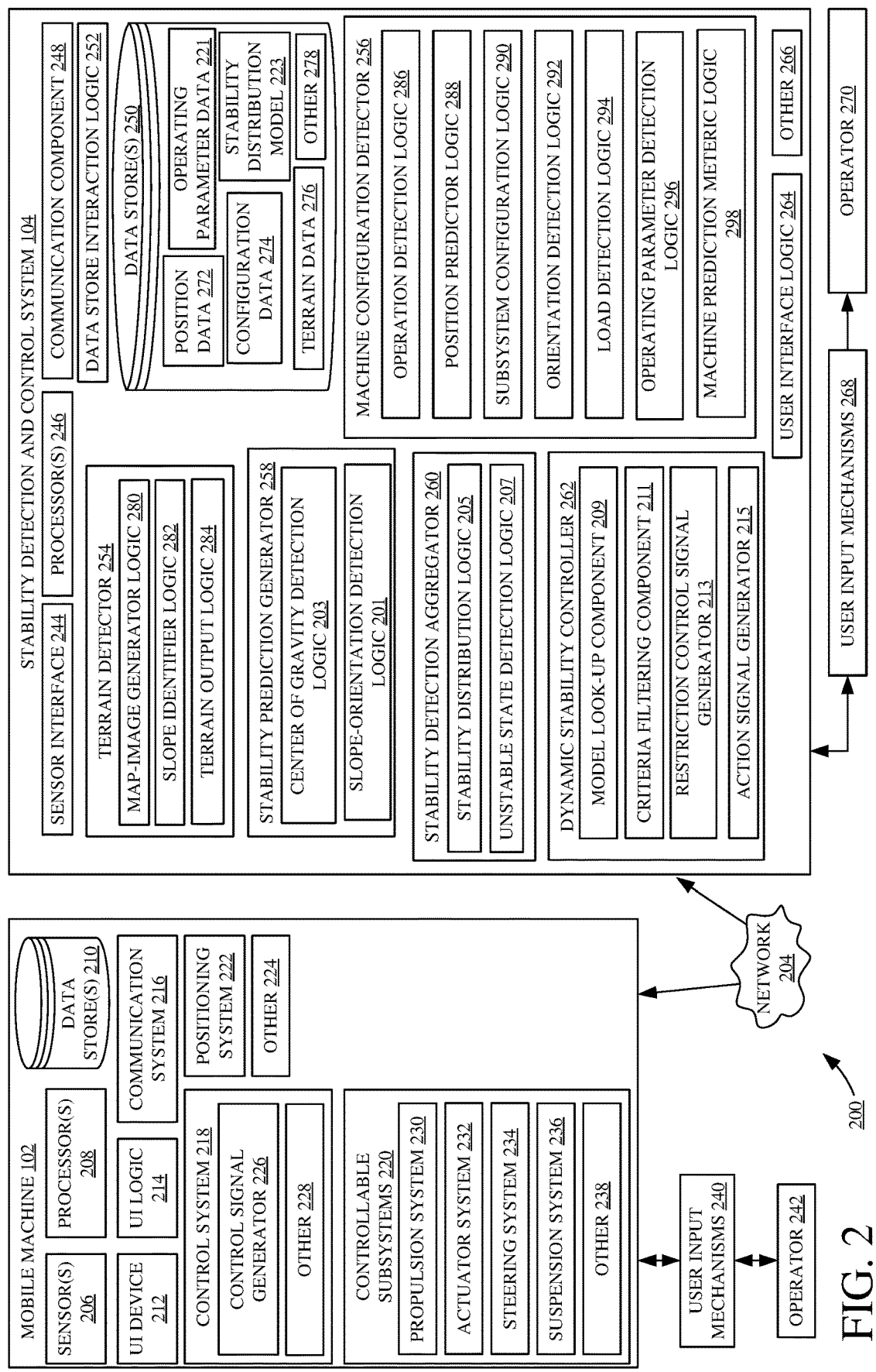
FIG. 2 is a block diagram of one example of a computing architecture that includes the stability detection and control system illustrated in FIG. 1.

FIG. 2 is a block diagram of one example of a computing architecture 200 that includes machine 102 and stability detection and control system 104 illustrated in FIG. 1. Prior to describing stability detection and control system 104 in detail, an overview of computing architecture 200 and machine 102 is first provided.

FIG. 2 illustratively shows that stability detection and control system 104 and machine 102 are connected over network 204. Thus, computing architecture 200 operates in a networked environment, where network 204 includes any of a wide variety of different logical connections such as a local area network (LAN), wide area network (WAN), controller area network (CAN) near field communication network, satellite communication network, cellular networks, or a wide variety of other networks or combination of networks. It is also noted that stability detection and control system 104 can be deployed on machine 102 such that the system performs the operations described herein without a networked connection. In addition, while the present description will primarily focus on an example of stability detection and control system 104 communicating with machine 102, it is noted that the same or similar functionality can be provided when communicating with a wide variety of other mobile machines and/or remote systems.

FIG. 2 illustratively shows that machine 102 includes one or more sensor(s) 206, one or more processor(s) 208, one or more data store(s) 210, a user interface device 212, user interface logic 214, a communication system 216, a control system 218, controllable subsystems 220, a positioning system 222, and other machine components 224.

In one example, machine 102 uses user interface logic 214 to generate operator interface displays having user input mechanisms 240 for display on user interface device 212 and for interaction by operator 242. Machine 102 can have other user input mechanisms 240 as well. Operator 242 can be a local operator of machine 102 in an operator's compartment of machine 102 and can interact with user input mechanisms 240 to control and manipulate machine 102. Operator 242 can also be a remote operator of machine 102, interacting with machine 102, for example, via a communication device over network 204. User input mechanisms 242 can include one or more actuatable items displayed on display devices (e.g., icons, or user actuatable buttons, displayed on user interface device 212), one or more audio devices, one or more haptic devices, and other items, such as a steering wheel, joysticks, pedals, levers, buttons, keypads, etc.

Sensor(s) 206 can generate a wide variety of different sensor signals representing a wide variety of different sensed variables. For instance, sensor(s) 206 can generate signals indicative of a position of movable element 107 relative to machine 102 (e.g., relative to frame 121). Sensor(s) 206 can also be optical sensors, load sensors, accelerometers, potentiometers, hall effect sensors, or other sensors that generate sensor signals indicative of, for example, net load on machine 102, speed of machine 102, acceleration of machine 102, hydraulic actuator 123 movement or position, a geographic location (e.g., where sensors 206 include a global positioning system (GPS) receiver or other positioning system 222), among others. Sensor(s) 206 can also include imaging sensors, such as video cameras, laser based sensors, LIDAR based sensors, radar, and a wide variety of other imaging or other sensing systems.

Positioning system 222 illustratively generates one or more signals indicative of a position of machine 102 at any given time during an operation. Generally, positioning system 222 receives sensor signals from one or more sensor(s) 206, such as a GPS receiver, a dead reckoning system, a LORAN system, or a wide variety of other systems or sensors, to determine a geographic position of machine 102 across jobsite 100. Positioning system 222 can also access data store 210 to retrieve stored positioning information that indicates positions of machine 102 in performing historical operations, as well as the paths and/or patterns of travel of machine 102 during performance of the historical operations.

Communication system 216 is generally configured to allow machine 102 to communicate with remote systems including other machines, stability detection and control system 104, among others. Thus, communication system 216 illustratively communicates over networks discussed above. It also illustratively allows portions of machine 102 to communicate with one another, such as over a controller area network (CAN) bus.

Control system 218 includes a control signal generator 226 that generates control signals for controlling a wide variety of different controllable subsystems 220 based on sensor signals generated by sensor(s) 206, based on information received through communication system 216 (e.g., information received from stability detection and control system 104), based on user inputs received through user input mechanisms 242 detected via user interface logic 214, based on positioning information obtained from positioning system 222, and/or it can generate control signals in a wide variety of other ways as well. Control system 218 can include other control system components 228 as well.

Controllable subsystems 220 illustratively include a propulsion system 230, an actuator system 232, a steering system 234, a suspension system 236, among a wide variety of other controllable subsystems 238. Propulsion system 230 generally includes an engine (or other power source—such as an electric power source, an electric drive, etc.) that drives ground engaging elements 101 via a powertrain mechanism. Actuator system 232 is configured to controllably drive movement and positioning of various actuators. For instance, it can drive movement of actuator 123, which moves movable element 107.

Stability detection and control system 104 illustratively includes a sensor interface 244, one or more processors 246, a communication component 248, one or more data store(s) 250, data store interaction logic 252, a terrain detector 254, a machine configuration detector 256, stability prediction generator 258, stability detection aggregator 260, a dynamic stability controller 262, user interface logic 264, among other stability detection and control components 266.

Sensor interface logic 244 obtains sensor signals from a wide variety of different sensors on one or more different mobile machines. Sensor interface logic 244 uses indications of the sensed signals to generate a set of sensor information that identifies the variables sensed by sensor(s) 206 on machine 102. In the example illustrated in FIG. 2, sensor interface logic 244 obtains sensor signals from sensor (s) 206, such as a weight sensor that senses a weight of material held by movable element 107. Sensor information generated by sensor interface logic 244 can therefore include an indication of a sensed load on machine 102, an indication of a sensed height of ground engaging elements 101, an indication of a sensed position of movable element 107, an indication of sensed speed or direction of travel of machine 102, sensed orientation of machine 102, among a wide variety of other sensor information. Sensor interface logic 244 can also generate sensor information indicating, for example, material characteristics (such as size, weight, material type, etc.) engine speed or other engine characteristics or variables sensed on machine 102, or variables indicative of the utilization of a movable machine element 107 (e.g., a saw, knife, grapple, bucket, etc.), among other things.

Communication component 248 is generally configured to facilitate communication between stability detection and control system 104 and a wide variety of remote systems (including, when system 104 is not on machine 102, machine 102), among others. Thus, communication component 248 illustratively communicates over networks discussed above.

In one example, stability detection and control system 104 uses user interface logic 264 to generate interface displays having user input mechanisms 268 for display on a user interface device for interaction by user 270. Stability detection and control system 104 can also or alternatively use user interface logic 264 to generate interface displays having user input mechanisms 268 for display on user interface device 212, and for interaction by operator 242. As such, information generated by stability detection and control system 104 can be provided as performance and control data to both a manager (e.g., user 270) of jobsite 100 and to a machine operator (e.g., operator 242). User interface logic 264 also detects user inputs through, or interaction with, user input mechanisms 240 and 268, which can take a wide variety of different forms, some of which are described below. User interface logic 264 can send an indication of the detected user interaction to other items in stability detection and control system 104, to machine 102, or elsewhere.

Data store(s) 250 stores a wide variety of different data that can be utilized by stability detection and control system 104 to detect stability of machine 102 and accordingly execute commanded control of machine 102. Data store(s) 250 illustratively stores position data 272 indicative of sensed positions of machine 102 in a geographic area, configuration data 274 indicative of detected configurations of machine 102 (e.g., what type of attachments are on machine 102, their current positions, whether machine 102 has tracks or wheels, the physical characteristics of machine 102 such as its dimensions, weight, weight distribution across its frame, etc.), terrain data 276 indicative of detected terrain in the geographic area surrounding machine 102, and a stability distribution model 223, among a wide variety of other data 278. Data store interaction logic 252 is configured to interact with data store(s) 250 to obtain any of position data 272, configuration data 274, terrain data 276, as well as a wide variety of other data 278, and provide the obtained data to any of the components of stability detection and control system 104 and/or machine 102.

Terrain detector 254 illustratively includes map-image generator logic 280, slope identifier logic 282, and terrain output logic 284. Terrain detector 254 is generally configured to detect a wide variety of different terrain characteristics to generate an accurate topographical representation of a geographic area surrounding machine 102 (e.g., ground surface 105).

Map-image generator logic 280 is configured to receive an indication of sensor signals corresponding to a geographic area surrounding machine 102. For example, map-image generator logic 280 receives an indication of a sensor signal generated by sensor 206 on machine 102 (e.g., a video camera, laser-based scan, LIDAR sensor, etc.). The sensor signal is indicative of a slope or other characteristic of the terrain being sensed, or it provides information from which that characteristic can be derived. Map-image generator logic 280 generates a map having a coordinate grid that plots a plurality of locations in the geographic area surrounding machine 102. Each location in the map corresponds to a position along a coordinate axis to which machine 102 might travel. Slope identifier logic 282 is configured to identify ground surface height information at a plurality of locations in the geographic area surrounding machine 102. Slope identifier logic 282 receives an indication of a sensor signal (e.g., sensor signal generated by sensor 206 on machine 102, such as a video camera, laser-based scan, LIDAR sensor, etc.) and detects a height or elevation of the ground surface at each position along the coordinate axis to which machine 102 might travel. Slope identifier logic 282 generates slope indications and incorporates the slope indications with the locations identified in the geographic map with map-image generator logic 280. That is, slope identifier logic 282 generates slope data indicative of a plurality of slope angles in the geographic area surrounding machine 102, and accordingly incorporates the slope data into the geographic map such that the geographic map includes topographical slope characteristics of the various positions to which machine 102 can travel (e.g., surrounding terrain where machine 102 may have contact through ground engaging elements 101).

Terrain output logic 284 is generally configured to evaluate the slope data and the geographical map to output indications of particular locations in the geographic area having identified slope angles. For instance, terrain output logic 284 applies a slope analysis to the slope data in the map to identify particular coordinate positions having slope angles above a threshold slope angle. This can be used to identify potential hazardous locations or locations around machine 102 that are likely to cause a change in machine stability. For example, terrain output logic 284 may identify positions having a large slope angle (e.g., steep ground surface) that will likely cause machine 102 to become unstable, regardless of an orientation or configuration of machine 102 at those positions. It will also be noted that where machine 102 has access to a topographical map of the terrain, map generator logic 280 can access that map (such as by downloading it from a remote system or accessing it in local memory.

Figure 1A:
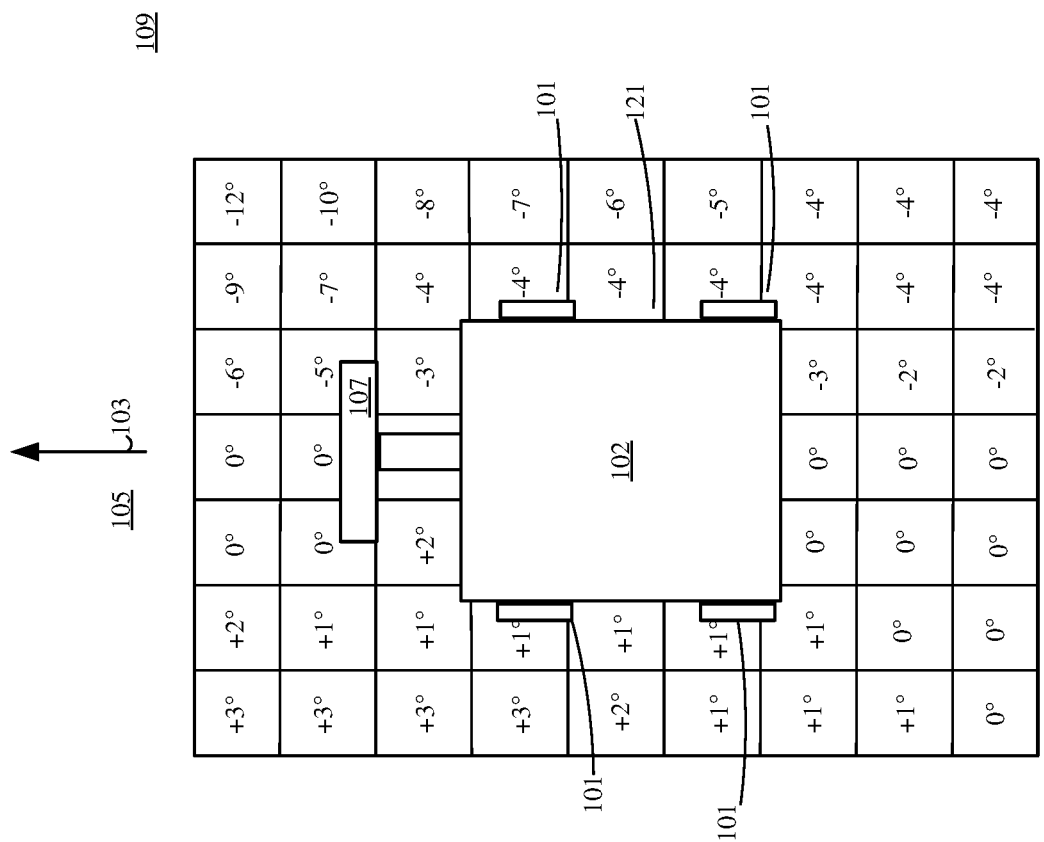
FIG. 1A is a pictorial illustration of a grid, indicating terrain of the jobsite shown in FIG. 1, generated by the stability detection and control system.

Whether the slopes are sensed or obtained from a map, terrain output logic 284 illustratively generates and outputs an indication of how the slope of the terrain changes in the vicinity of machine 102. FIG. 1A shows one example of this. It can be seen that the terrain around machine 102 is broken into grid sections. The slope of each grid section may be fixed or variable (such as based on slope, or slope change, etc.). By way of example, each grid section may be 1 foot square, two feet square, or the size of the grid section may vary with topology or be a different size. Each grid section has a corresponding value indicative of the slope of the terrain in that section. As machine 102 moves, the overall grid is updated so it continues to plot the areas around machine 102. Also, the number of grid sections may increase or decrease. For example, as machine 102 speeds up, the system may increase the amount of terrain included in the grid, in the direction of travel. All of these variations and others are contemplated herein.

Machine configuration detector 256 illustratively includes operation detection logic 286, position predictor logic 288, subsystem configuration logic 290, orientation detection logic 292, load detection logic 294, operating parameter detection logic 296, and machine prediction metric logic 298. Machine configuration detector 256 generally obtains a wide variety of information for determining likely characteristics of operation of machine 102. These likely characteristics are used by stability detection and control system 104 to predict a likely center of gravity of machine 102 at various locations at jobsite 100 (e.g., when elements 101 are contacting different grid sections) and generate a dynamic stability control signal that controls machine 102 to avoid an unstable state.

Position predictor logic 288 is configured to detect and predict a wide variety of positions in a geographic area surrounding machine 102 to which machine 102 can travel. That is, position predictor logic 288 predicts locations (or grid sections) to which machine 102 is likely to travel and generates an output indicative of coordinate positions in the geographic map (or grid generated by map-image generator logic 280). Position predictor logic 288 generates, for each position (or each grid section), a measure indicative of probability or likelihood that machine 102 will travel to that position (or grid section). Position predictor logic 288 detects the predicted positions based on a current or predicted operation being performed by machine 102 (e.g., as detected by operation detection logic 286), current or predicted subsystem configurations of machine 102 (e.g., configuration data 274), current or predicted operating parameters of machine 102 (e.g., operating parameter data 221), jobsite conditions such as terrain conditions (e.g., terrain data 276), a time of day, weather conditions, operator identification, and a wide variety of other information relevant to operation of machine 102. In one example, position predictor logic 288 predicts positions to which machine 102 will travel based on a current position of machine 102 and where machine 102 previously traveled by accessing position data 272 (e.g., positions of machine 102 when a similar operation was previously performed).

Operation detection logic 286 is configured to detect and predict operations performed by machine 102 at jobsite 100. Specifically, it predicts operations that are likely to be performed by machine 102 and generates an output indicative of the predicted operations. For instance, operation detection logic 286 receives an indication of the predicted positions (or grid sections) to which machine 102 is likely to travel, as determined by position predictor logic 288. For each predicted position (or grid section), operation detection logic 286 predicts one or more operations that are likely to be performed by machine 102. The position of machine 102 may occupy a plurality of different grid sections. Ground engaging elements 101, for instance, may each contact the terrain a different grid section. Therefore, the "position" of machine 102 may correspond to a span or set of multiple grid sections. Operation detection logic 286 generates a measure indicative of probability or likelihood that machine 102 will be controlled to perform an operation at each of the predicted positions (or set of grid sections). In one example, operation detection logic 286 identifies, for each set of grid sections that machine 102 may occupy, a particular one of the predicted operations as an operation that is most likely to be performed by machine 102. The operation may be, for instance, a dig operation, a dump operation, a drive operation, or a wide variety of others. Operation detection logic 286 can detect the predicted operations based on current or predicted subsystem configurations of machine 102 (e.g., configuration data 274), current or predicted operating parameters of machine 102 (e.g., operating parameter data 221), jobsite conditions such as terrain conditions (e.g., terrain data 276), a time of day, weather conditions, operator identification, and a wide variety of other information corresponding to operation of machine 102. In one example, operation detection logic 286 predicts likely operations by detecting a current operation of machine 102 and historical operations performed by machine 102 by accessing historical performance information stored in data store 250.

Subsystem configuration logic 290 is configured to detect and predict subsystem configurations of machine 102. Specifically, it predicts how machine 102 will be controllably configured at each of the predicted positions. Machine 102 can be controllably configured by adjusting controllable subsystems 220. Adjustments to controllable subsystems 220 can include, for example, adjusting a position of movable element 107 relative to frame 121, adjusting a type of attachment or implement coupled to machine 102, adjusting a stiffness of suspension system 236, adjusting a steering angle with steering system 234 (e.g., actuating a movable element to turn ground engaging elements 101), among other adjustments that can be performed automatically, semi-automatically, or manually by operator 242. It will be noted that adjusting a position of movable element 107 need not be adjusting an attachment or implement. Instead, it can be an adjusting actuator that turns ground engaging elements 101, or that turns the front wheels of a machine or articulates a dump truck or articulated loader. These and other moveable elements are all contemplated herein. Subsystem configuration logic 290 generates an output indicative of the predicted configurations and a measure of probability or likelihood that machine 102 will be configured according to each of the predicted configurations in each of the positions. For example, for each predicted position, subsystem configuration logic 290 detects a most likely configuration of controllable subsystems 220. It predicts the configurations based on current or historical configurations of machine 102 by accessing configuration data 274, current or predicted operations performed by machine 102 (e.g., as detected by operation detection logic 286), current or predicted operating parameters of machine 102 (e.g., operating parameter data 221), jobsite conditions such as terrain conditions (e.g., terrain data 276), a time of day, weather conditions, operator identification, and a wide variety of other information relevant to configuration of machine 102 at job site 100.

Operating parameter detection logic 296 is configured to detect and predict operating parameters of machine 102. Specifically, it predicts likely operating parameters of machine 102 for each predicted position. Operating parameters can include, for example, an engine speed, an engine load, a travel speed, a speed at which movable element 107 can be moved to different positions, among other operating parameters. Operating parameter detection logic 296 generates an output indicative of predicted operating parameters and a measure of probability or likelihood that machine 102 will operate according to each of the predicted operating parameters in each of the positions. Operating parameter detection logic 296 predicts operating parameters of machine 102 based on current or historical operating parameters of machine 102 by accessing operating parameter data 221, current or predicted operations performed by machine 102 (e.g., as detected by operation detection logic 286), jobsite conditions such as terrain conditions (e.g., terrain data 276), a time of day, weather conditions, operator identification, and a wide variety of other information relevant to configuration of machine 102 at jobsite 100.

Load detection logic 294 is configured to detect and predict a load on machine 102. Specifically, it predicts a load on machine 102 for each predicted position. A load on machine 102 generally refers to a net load imparted to machine 102. A net load can include a weight of a material being hauled by machine 102 (e.g., weight of material 115), a weight of machine 102, itself, applied to ground engaging elements 101, and a direction of load application on frame 121 (e.g., a force vector), among other indications of load. Load detection logic 295 generates an output indicative of a predicted load for each of the predicted positions. It also generates a measure of probability or likelihood that the predicted load will be imparted on machine 102 for each position. Load detection logic 294 predicts loads on machine 102 based on a current or historical load on machine 102 by accessing performance information stored in data store 250, current or predicted positions, current or predicted operations, current or predicted subsystem configurations, and/or a wide variety of other performance information relevant to load on machine 102. In one example, load detection logic 294 generates an output indicative of a most likely predicted load on machine 102 and a measure of probability or likelihood that it will be imparted on machine 102 at a predicted position.

Orientation detection logic 292 is configured to detect and predict orientations of machine 102. Specifically, it predicts orientations of machine 102 for each predicted position. An orientation of machine 102 generally refers to an orientation of machine 102 relative to gravity. Orientations of machine 102 can include, for example, an orientation of a net load on machine 102 relative to gravity, an orientation of frame 121 or a chassis relative to a slope angle, an orientation of ground engaging elements 101 relative to a height of a ground surface contacting elements 101, and a wide variety of other orientations. Orientation detection logic 292 predicts orientations of machine 102 for the predicted positions based on current or historical orientations (e.g., by accessing performance information stored in data store 250), current or predicted positions, current or predicted operations, current or predicted subsystem configurations, current or predicted loads, and a wide variety of other performance information relevant to controllable orientations of machine 102. In one example, orientation detection logic 292 generates an output indicative of a most likely predicted orientation of machine 102 and a measure of probability or likelihood that machine 102 will be oriented in the likely orientation at a predicted position.

Machine prediction metric logic 298 is configured to detect predicted operating performance information generated by machine configuration detector 256. Machine prediction metric logic 298 generates a probability distribution indicative of predicted control of machine 102 across the predicted positions in a geographic area surrounding machine 102. That is, machine prediction metric logic 298 obtains the outputs generated by machine configuration detector 256 to detect the measure of probability that machine 102 travels to a predicted position, the measure of probability that machine 102 will be controlled to perform a particular operation, the measure of probability that machine 102 will be configured in a predicted configuration, the measure of probability that machine 102 will be controllably operated according to a predicted operating parameter, the measure of probability that a predicted load will be imparted on machine 102, and the measure of probability that machine 102 will be oriented according to a predicted orientation. Machine prediction metric logic 298 aggregates the outputs to generate a probability distribution indicative of predicted control of machine 102 at jobsite 100. The probability distribution generated by machine prediction metric logic 298 is used by stability detection and control system 104 to predict where machine 102 is likely to travel, and how machine 102 is likely to be controlled in order to preemptively identify and avoid hazardous situations.

It will be appreciated that machine prediction metric logic 298 continuously updates its prediction to accommodate for changing conditions. For instance, if machine 102 is moving quickly in a forward direction indicated by arrow 103, the likelihood that it will occupy a grid section behind it is quite low. However, if machine 102 slows down or stops, the likelihood that it will occupy a grid section behind it may change significantly. All of these, and other variations, are accommodated.

Stability prediction generator 258 illustratively includes slope-orientation detection logic 201 and center of gravity detection logic 203. Slope-orientation detection logic 201 is configured to access the information generated by terrain detector 254 to identify positions in the geographic area surrounding machine 102 having a relatively steep slope angle. For instance, it compares the slope angles detected by slope identifier logic 282 to a threshold slope angle. If a slope angle for a given position exceeds a threshold slope angle, slope-orientation detection logic 201 determines that the given position has a relatively steep slope and generates an output based on the determination. Slope-orientation detection logic 201 also accesses the probability distribution generated by machine prediction metric logic 298. Based on the probability distribution, it identifies the predicted operating characteristics of machine 102 corresponding to the positions that were determined to have a steep slope. As such, slope-orientation detection logic 201 detects a likely orientation of machine 102 if it were to contact a portion of ground surface having a steep slope. For example, it calculates a likely height or elevation of ground engaging elements 101, relative to one another, at the portion of ground having the steep slope. Slope-orientation detection logic 201 generates outputs indicative of the calculated likely heights (or elevations) of ground engaging elements 101. It can also generate the outputs for each predicted position to which machine 102 might travel, regardless of whether the predicted positions are determined to have a steep slope.

Center of gravity detection logic 203 is configured to generate an output indicative of one or more predicted centers of gravity of machine 102 for each predicted position to which machine 102 might travel. Center of gravity detection logic 203 calculates an expected center of gravity of machine 102 based, at least in part, on the outputs generated by slope-orientation detection logic 201 and the outputs generated by machine configuration detector 256. For instance, it generates a set of values indicating different centers of gravity of machine 102 that are predicted for a given position. Each predicted center of gravity corresponds to one of the likely slope-orientations of machine 102 at the given position (e.g., as determined by slope-orientation detection logic 201). It calculates each predicted center of gravity by analyzing the likely heights (or elevations) of ground engaging elements 101 and the likely net loads on machine 102 (e.g., generated by load detection logic 294). Center of gravity detection logic 203 generates an output indicative of a measure of probability or likelihood that machine 102 will be orientated at a given position such that it has one of the predicted centers of gravity.

Stability detection aggregator 260 illustratively includes stability distribution logic 205 and unstable state detection logic 207. Stability distribution logic 205 is configured to generate a stability distribution model 223 for the geographic area surrounding machine 102. To generate stability distribution model 223, stability distribution logic 205 performs a statistical analysis on the predicted centers of gravity of machine 102 to determine an expected center of gravity of machine 102 for each predicted position. Therefore, for each predicted position, stability distribution logic 205 generates an output indicative of a measure of probability or likelihood that machine 102 will travel to the position and operate in a manner to have a most likely (expected) center of gravity. The stability distribution model 223 generally provides a statistical distribution that identifies, for each position, an association between the expected center of gravity of machine 102 and the likely operating characteristics of machine 102 (that likely produce that expected center of gravity). As such, stability distribution logic 205 uses statistical aggregations to model how the terrain information, predicted machine configuration information, and predicted stability information are analyzed to calculate the center of gravity expected of machine 102 at each position. In one example, stability distribution model 223 generates a mapping that maps the predicted machine configuration information (e.g., predicted subsystem configurations, predicted load, predicted orientation, etc.) to the center of gravity expected of machine 102 at each position.

Unstable state detection logic 207 is configured to identify particular positions associated with a high likelihood of machine 102 being in an unstable state. More specifically, it identifies one or more positions in jobsite 100 at which machine 102 is likely to tip over or to be otherwise unstable. To determine whether a position is likely to cause an unstable state of machine 102, unstable state detection logic 207 generates a stability limit. The stability limit defines a threshold area relative to machine 102 (e.g., a perimeter). In one example, a center of gravity is determined to be within the threshold area when a net load on machine 102, due to gravity and external forces, is positioned within a perimeter (e.g., polygon) of contact points defined by ground engaging elements 101 and a ground surface. As such, machine 102 will be in a stable state when the center of gravity of machine 102 is within the threshold area. Machine 102 will be in an unstable state when the center of gravity of machine 102 is outside of the threshold area. Unstable state detection logic 207 determines whether the expected center of gravity, expected of machine 102 for a given position, is within the stability limit (or threshold area). If it determines that the expected center of gravity is not within the stability limit, it identifies the given position as corresponding to a likely unstable state of machine 102.

Unstable state detection logic 207 also calculates an aggregate measure (e.g., statistical average) of the stability distribution. That is, it calculates a statistical average of machine 102 having an expected center of gravity that produces an unstable state. The statistical average generally represents an aggregated measure of probability that machine 102 will be in any given position, and encounter an unstable state across jobsite 100. Unstable state detection logic 207 determines whether the statistical average exceeds a threshold level of probability. If it determines that the statistical average does exceed the threshold level of probability, unstable state detection logic 207 generates an output indicating a high probability that machine 102 will encounter low stability at some future time during an operation. On the other hand, if unstable state detection logic 207 determines that the statistical average is within the threshold level of probability, it generates an output indicative of a low probability that machine 102 will encounter low stability at some future time during an operation. It will be appreciated that the various measures of probability work together. For instance, if the probability is very high that machine 102 would be unstable in a certain position, but the probability very low that machine 102 will be in that position, and the probability is very low that machine 102 will have its bucket raised to maximum height, the three probabilities modulate each other. Unstable state detection logic 207 provides an output, indicating the determined high or low probability of encountering low stability, for storing an updated stability distribution model 223 at data store 250.

Dynamic stability controller 262 is configured to generate control signals that control operation of machine 102 to avoid a predicted unstable state and thereby prevent machine 102 from becoming unstable or tipping over. Dynamic stability controller 262 illustratively includes a model look-up component 209, a criteria filtering component 211, a restriction control signal generator 213, and an action signal generator 215.

Model look-up component 209 is configured to identify positions determined as having a high probability of producing low stability, based on the output generated by unstable state detection logic 207. For instance, model look-up component 209 accesses the updated stability distribution model 223 to identify positions having a high probability of producing low stability. Based on the mapping provided by stability distribution model 223, model look-up component 209 identifies predicted machine configuration information (e.g., machine configurations, operating parameters, loads, orientations, operating performance characteristics, etc.) mapped to the expected center of gravity of machine 102 corresponding to the identified positions. That is, each set of grid sections corresponding to a machine position has a number of different values associated with it. There will be a likelihood or probability that machine 102 will be in that position. There is a terrain/slope indicator for that position. There will be a likelihood or probability that machine 102 will be in each of a plurality of different configurations and exhibit certain parameters or operating characteristics (e.g., traveling at a certain speed, with its bucket at a certain height, with a particular load, in a particular direction, etc.). Each of these different combinations will have a corresponding stability indicator that indicates whether machine 102 will be stable or unstable under those circumstances.

Model look-up component 209 identifies particular control signals that are used by control system 218 to controllably employ machine 102. For each control signal, it calculates a value indicative of a level of impact that the control signal has on machine 102 being unstable. That is, model look-up component 209 calculates a weighted value indicative of a degree of deviation, of the center of gravity from the threshold area, that is attributed to a particular type of control of machine 102. For example, it may be that if machine 102 is in a certain position traveling at a certain speed, with its bucket (movable element 107) at a certain height, it will be unstable. However, it may also be that if the operator simply lowers the bucket by 1 foot machine 102 will be stable. The control signal to lower the bucket thus has a high impact on stability. Therefore, for example, model look-up component 209 accesses stability distribution model 223 to determine that machine 102 will likely employ either a first configuration (bucket raised highly) or a second configuration (bucket lowered) if it travels to a position having a high probability of low stability. Model look-up component 209 identifies a first set of control signals (that raise the bucket) that controllably move movable element 107 to employ machine 102 with the first configuration, and a second, different set of control signals (that lower the bucket) that controllably move movable element 107 to employ machine 102 with the second configuration. Model look-up component 209 determines that, if machine 102 is controlled according to the first set of control signals, machine 102 will be employed in the first configuration with an expected center of gravity with a large deviation from the stability limit. If machine 102 is controlled according to the second set of control signals, model look-up component 209 determines that machine 102 will be employed in a second configuration and have an expected center of gravity within the stability limit. Model look-up component 233 assigns a strong weighted value to the first set of control signals and a lesser weighted value to the second set of control signals. In this example, the strong weighted value indicates that the first set of control signals should be restricted out from control (e.g., the operator should be inhibited from executing such control), as they are more likely to employ machine 102 in a manner that results in a high probability of experiencing low stability.

As such, model look-up component 209 selects particular machine configurations, operating parameters, loads, orientations, or other operating characteristics that are identified as strong contributors to machine 102 likely being unstable at a particular position. Model look-up component 209 generates an output indicative of the selected characteristics of operating performance and their corresponding weighted values.

Criteria filtering component 211 is configured to filter a wide variety of characteristics of operating performance of machine 102 based on an indication of the output generated by model look-up component 209. Criteria filtering component 211 identifies a set of all possible operating characteristics of machine 102. It then filters out a subset of operating characteristics that correspond to the control signals identified by model look-up component 233 as strong contributors a likely unstable state. The subset of characteristics is filtered out in order to differentiate between a filtered list of control signals that are enabled with controllable operation of machine 102 and a filtered list of control signals that are restricted from controllable operation of machine 102. Criteria filtering component 211 generates an output indicative of the filtered lists of control signals.

Restriction control signal generator 213 is configured to generate a restriction control signal that restricts control of machine 102 to avoid encountering an unstable state. It generates a restriction control signal based, at least in part, on an indication of the output generated by criteria filtering component 211. For instance, a restriction control signal prevents generation of the control signals that were filtered for restriction by criteria filtering component 211, thereby preventing employment of machine 102 with subsystem configurations, operating parameters, orientations, loads, or other operating characteristics identified as strong contributors to likely instability. The restriction control signal can restrict generation of a single control signal (e.g., it can prevent the operator from raising the bucket beyond a certain height) and/or multiple sets or groups of control signals (e.g., it can restrict the operator from raising the bucket beyond a certain height and from turning at a steep turning angle while traveling above a certain speed). As another example, restriction control signal generator 213 can generate a restriction control signal that prevents machine 102 from being operated to enable the machine to travel to a particular position in a given orientation in which it would be unstable. In this example, machine 102 is restricted from traveling to a position determined to have a high probability of producing instability. In another example, restriction control signal generator 213 generates a restriction control signal that does not prevent machine 102 from traveling to a position but does prevent generation of a control signal that would otherwise orient machine 102 with a net load on a steep slope and cause machine 102 to tip over. That is, it may restrict machine 102 from traveling over a position in the downhill direction, with a heavy load carried high, but it would not restrict machine 102 from traveling over the same terrain in the uphill direction with the load carried lower. Restriction control signal generator 213 generates an output indicative of the restriction control signal. The output can be provided to machine 102, for example, to restrict generation of the control signals that would otherwise be generated by control signal generator 226.

Action signal generator 215 is configured to generate an action signal based on a wide variety of information generated by stability detection and control system 104. Action signal generator 215 can generate an action signal that controls control system 218 to implement automated control of one or more controllable subsystems 220. For example, it generates an action signal that automatically controls control system 218 to controllably adjust steering system 234 to avoid a position determined as being likely to produce an unstable state. For instance, if one of the sensors senses a tree stump in a particular grid section, steering system 234 can be controlled to avoid one of the wheels traveling over that tree stump. Action signal generator 215 can generate an action signal that controls user interface logic 264 and/or 214 to generate a user interface display having a graphical icon representing stability detection and control information. For example, it controls user interface logic 264 and/or 214 to generate a user interface display having a graphical icon that visually identifies a position to be avoided due to likely instability. Action signal generator 215 generates a wide variety of different action signals to automatically or semi-automatically control machine 102 to avoid an unstable state, and/or to provide operator assistance features that enable operator 242 to understand stability hazards and take corrective action before they occur.

Figures 1, 3:
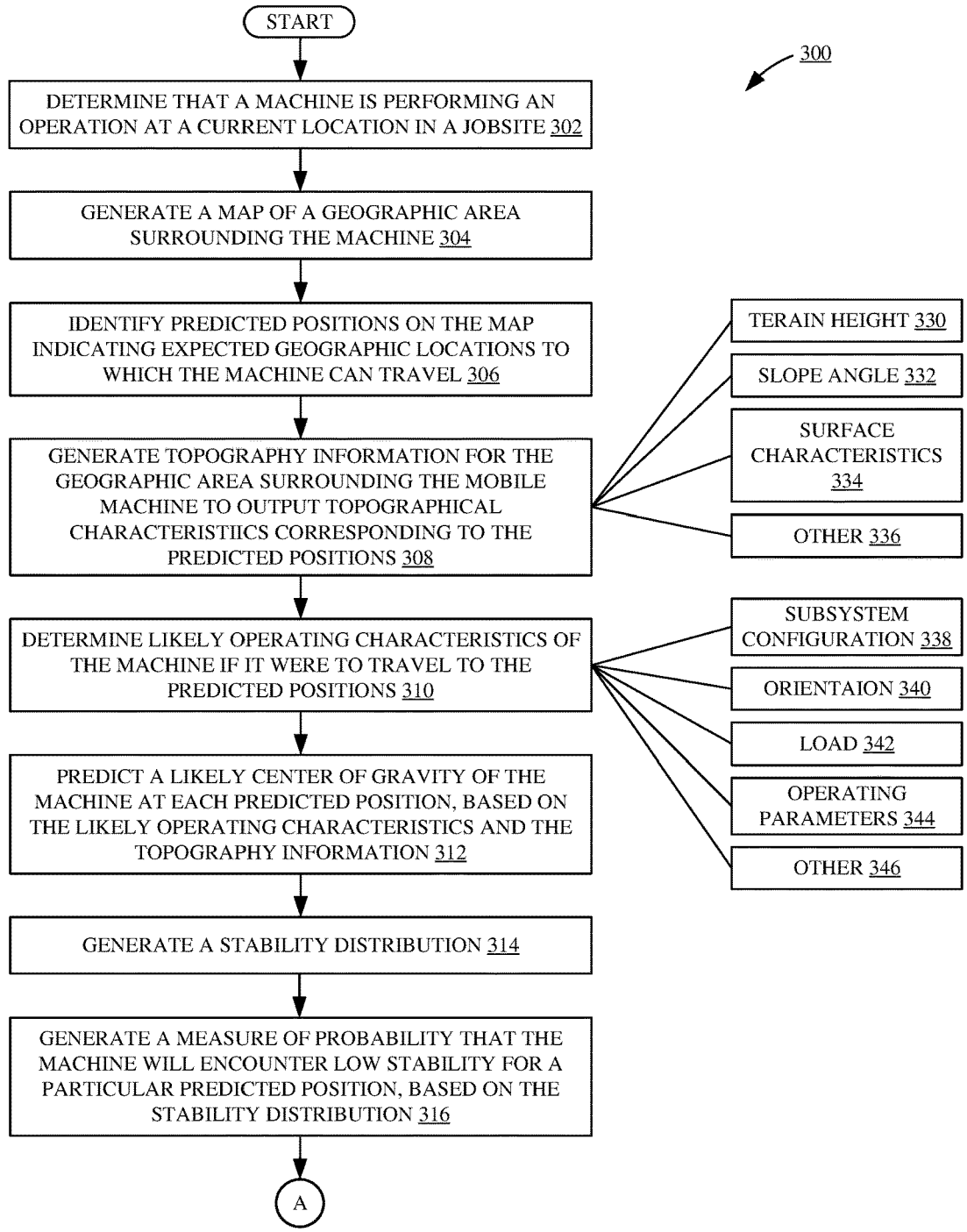
FIG. 3 (FIG. 3-1 and FIG. 3-2 collectively) illustrates a flow diagram showing one example of performing a stability detection and control analysis to control a machine.
Figures 2, 3:
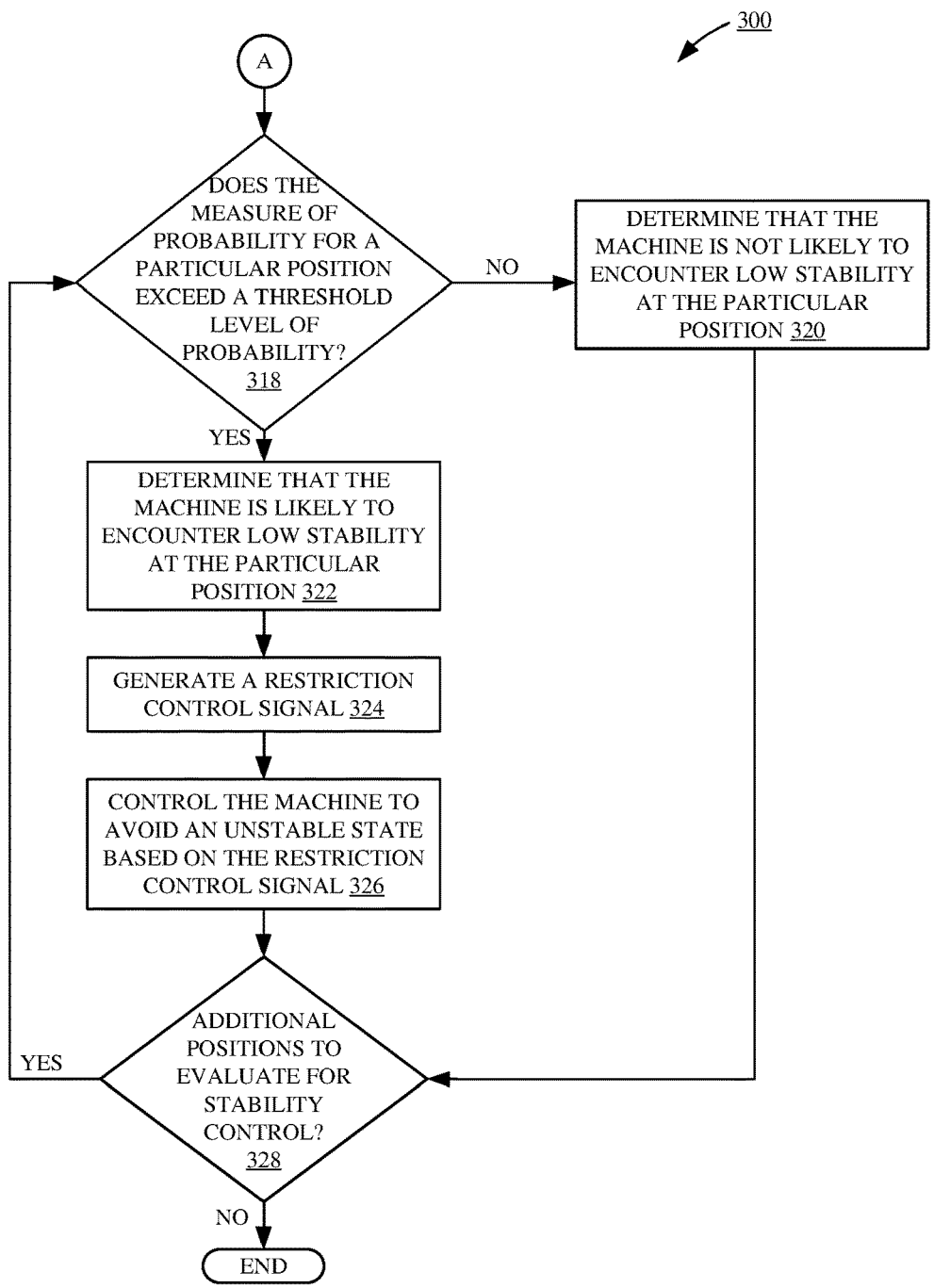

FIG. 3 (FIG. 3-1 and FIG. 3-2 collectively) illustrates a flow diagram showing one example method 300 for performing a stability detection and control analysis to control machine 102. At block 302, machine configuration detector 256 uses operation detection logic 286 to determine that a machine 102 is performing an operation and is positioned at a current location in jobsite 100. In one example, operation detection logic 286 identifies a type of an operation being performed by machine 102 and a location at which machine 102 is currently positioned based on indications of sensor information received from sensor interface 244 (e.g., buttons or levers being actuated by operator 242, positioning information generated by positioning system 222, etc.).

At block 304, terrain detector 254 uses map-image generator logic 280 to generate a map of a geographic area surrounding machine 102. Map-image generator logic 280 can generate the map based on positioning information generated by positioning system 222 and indications of sensor information received from sensor interface 244 (e.g., indications of sensor signals generated by imaging sensor 206, based on a topographical map, etc.).

At block 306, machine configuration detector 256 uses position predictor logic 288 to identify a set of expected travel points on the map indicating geographic locations to which machine 102 can travel (or grid sections on the grid). Position predictor logic 288 predicts where machine 102 is likely to travel based on a wide variety of information, such as identified type of operation and the current location, direction of travel, and speed of machine 102, among other things. In one example, position predictor logic 288 generates a measure of probability that machine 102 will travel to one of the predicted positions and does so for each predicted position across the geographic area surrounding machine 102.

At block 308, terrain detector 254 generates an expected topography characteristic for each geographic location in the area surrounding machine 102 to output topographical characteristics corresponding to the predicted positions. Terrain detector 254 can generate topography characteristic information indicative of terrain height 330 or elevation, slope angle 332, surface characteristics 334 (e.g., firmness, obstacles such as tree stumps or rocks, type of surface material such as mud, soft soil, rock, etc.), and other topographic information 336.

At block 310, machine configuration detector 256 determines likely operating characteristics of machine 102 if it were to travel to the predicted positions. Determining likely operating characteristics can include using subsystem configuration logic 290 to determine likely subsystem configurations 338, using orientation detection logic 292 to determine likely machine orientation 340, using load detection logic 294 to determine a likely load 342, using operating parameter detection logic 296 to determine likely operating parameters 344, and using machine configuration detector 256 to determine a wide variety of other likely operating characteristics 346. As such, at block 310 machine configuration detector 256 predicts one or more operating characteristics of machine 102 (e.g., bucket height, travel speed, turning angle, etc.) if the machine were to travel to each of the predicted positions.

At block 312, stability prediction generator 258 predicts a likely center of gravity of machine 102 at each predicted position, based on the likely operating characteristics and the topography information. In accordance with block 312, slope-orientation detection logic 201 predicts, for each predicted position, a likely orientation of machine 102 relative to a slope angle and a net load on the machine. Center of gravity detection logic 203 uses the likely orientation of machine 102, as predicted by slope-orientation detection logic 201, to predict a likely center of gravity of machine 102 for each predicted position.

At block 314, stability distribution logic 205 generates a stability distribution. Stability distribution logic 205 calculates a statistical stability distribution on the centers of gravity that are predicted for each position across jobsite 100. For instance, machine 102 can be controlled, at each position, according to many different configurations and orientations. For example, stability detection and control system 104 detects that machine 102 might be oriented at a position with a first configuration (e.g., bucket raised), and therefore predicts a first center of gravity of the machine for that position. Stability detection and control system 104 also detects that machine 102 might be oriented at the same position with a second configuration (e.g., bucket lowered), and therefore predicts that machine 102 might have a second, different center of gravity at the same position but in a different configuration. The stability distribution generated at block 314 provides a statistical analysis across the different centers of gravity that machine 102 might have at a position, for each position. It considers both the probability or likelihood that machine 102 will occupy that position and the probability or likelihood that machine 102 will be in that particular configuration. As such, block 314 includes stability distribution logic 205 generating an output indicative of an average, predicted center of gravity.

At block 316, unstable state detection logic 207 generates a measure of probability that machine 102 will encounter low stability at a particular predicted position, based on the stability distribution. For instance, unstable state detection logic 207 calculates a statistical average indicating a likelihood that machine 102 will have an expected center of gravity that produces an unstable state at the particular position. It generates a measure of probability, for example, that indicates an average measure of likelihood that machine 102 will have an expected center of gravity that exceeds a stability limit (e.g., where the center of gravity is located outside a polygon bounded by wheels 101).

At decision block 318, unstable state detection logic 207 determines whether the measure of probability, that machine 102 will encounter low stability at a particular position, exceeds a threshold level of probability. If unstable state detection logic 207 determines that the measure of probability does not exceed the threshold level of probability, method 300 illustratively proceeds to block 320. At block 320, unstable state detection logic 207 determines that machine 102 is not likely to encounter low stability at the particular position and processing illustratively proceeds to decision block 328.

Alternatively, at decision block 318, if unstable state detection logic 207 determines that the measure of probability does exceed a threshold level of probability, method 300 illustratively proceeds to block 322. At block 322, unstable state detection logic 207 determines that machine 102 is likely to encounter low stability at the particular position. In one example, block 322 includes unstable state detection logic 207 generating an output indicative of the particular position being identified as a position that would likely produce an unstable state if machine 102 were to travel there.

At block 324, dynamic stability controller 262 generates a restriction control signal. Block 324 therefore includes restriction control signal generator 213 generating a restriction control signal that restricts, or otherwise prevents, control of machine 102 to automatically avoid the unstable state at the particular position. In one example, block 324 includes model look-up component 209 identifying the various different machine orientations, configurations, and other operating characteristics that were predicted for the particular position. Criteria filtering component 211 filters out a list of control signals that should be restricted from control of machine 102 and that are filtered because they correspond to the machine orientations, configurations, and operating characteristics identified by model look-up component 209. That is, the restriction control signal generated by restriction control signal generator 213 controllably restricts generation, by control signal generator 226, of the filtered-out list of control signals. The remaining control signals (other than those that are filtered-out of a list of possible control signals) can remain enabled (unrestricted) for control of machine 102.

At block 326, control system 218 controls machine 102 based on the restriction control signal generated at block 324 in order to avoid the unstable state at the particular position. For example, block 326 can include controlling machine 102 to change a steering angle relative to a slope angle, change a position of movable element 107, reduce a load on machine 102, change a travel speed, among a wide variety of other changes or adjustments to automatically or semi-automatically control machine 102 to avoid the unstable state. As such, control signal generator 226 is restricted to only generate some of the possible control signals that are otherwise available. The control signals that are allowed to be generated, based on the restriction control signal, thereby control machine 102 to perform an operation and avoid the unstable state at the particular position.

At decision block 328, unstable state detection logic 207 accesses the stability distribution to determine if there are any more predicted positions to analyze for detecting likely unstable states. If there are no more positions to analyze, method 300 illustratively ends. However, if unstable state detection logic 207 determines that there are additional positions to analyze, processing illustratively returns to block 316 where stability detection aggregator 260 generates a measure of probability that machine 102 will encounter low stability at a different one of the predicted positions.

This operation continues, dynamically updating the probabilities based on new machine position and different sensor inputs, as long as machine 102 is being used.

Figure 4:
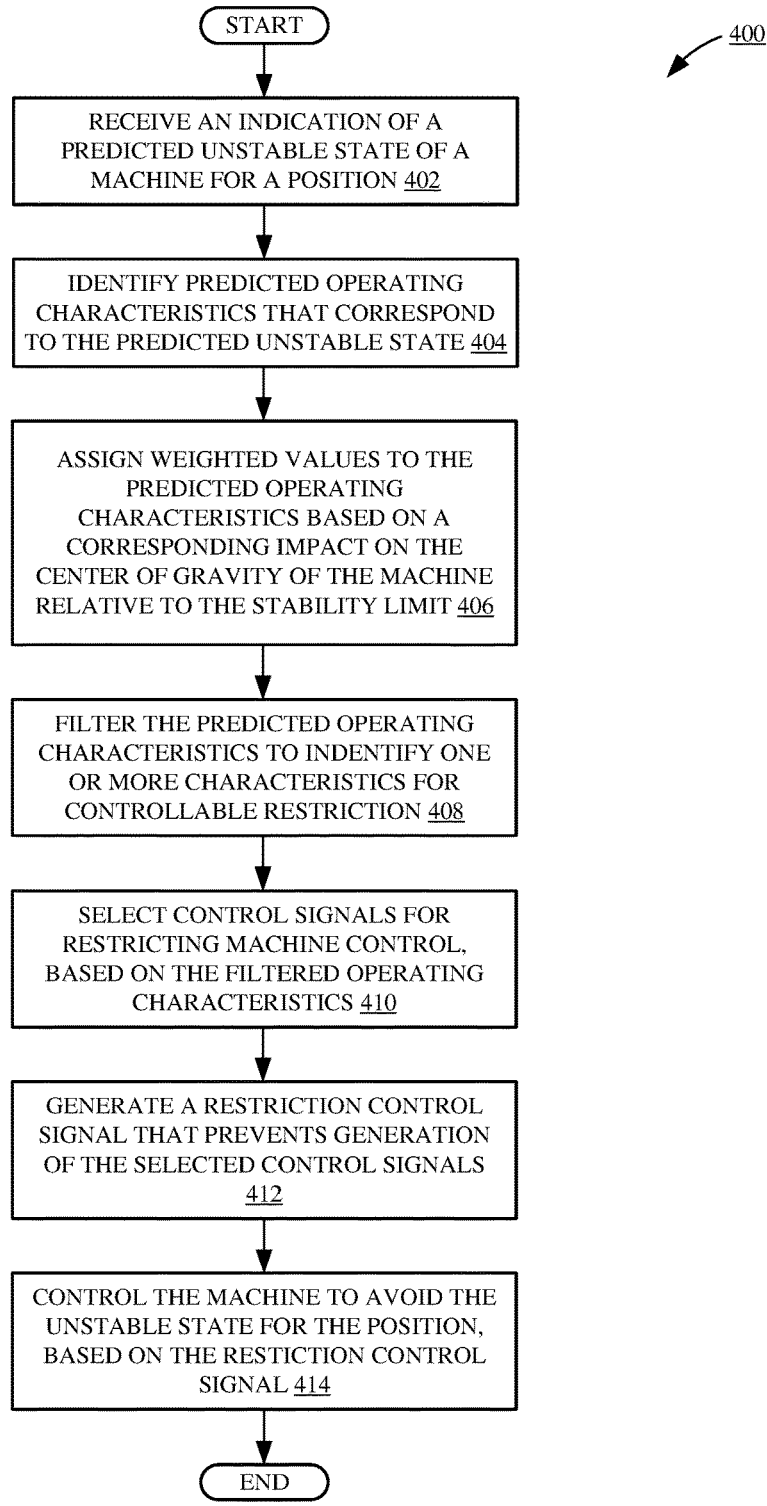
FIG. 4 illustrates a flow diagram showing one example of performing a dynamic control analysis to dynamically control a machine to enhance stability.

FIG. 4 illustrates a flow diagram showing one example operation 400 of performing a dynamic stability control analysis to dynamically control a machine to enhance stability. At block 402, dynamic stability controller 262 receives an indication of a predicted unstable state of machine 102 at a position in the geographic area surrounding machine 102. For instance, block 402 includes model look-up component 209 receiving the indication of a predicted unstable state. For instance, it may be highly likely that machine 102 will occupy a position in a configuration that renders it unstable.

At block 404, model look-up component 209 identifies predicted operating characteristics that correspond to the predicted unstable state. For instance, block 404 includes model look-up component 209 accessing stability distribution model 223 to identify particular machine configurations, orientations, operating parameters, and other operating characteristics mapped to the position having a high probability of producing low stability.

At block 406, model look-up component 209 assigns weighted values to the particular operating characteristics identified at block 404. That is, model look-up component 209 calculates, for a given operating characteristic, a weighted value that indicates what impact changing a particular operating parameter (e.g., bucket level, ground speed, etc.) will have on ensuring that the center of gravity of machine 102 will remain within the stability limit. For example, assume that a first predicted operating characteristic of machine 102 at the position under analysis indicates a likely travel speed. A second predicted operating characteristic of machine 102 at the position under analysis indicates a likely angular position (e.g., height) of movable element 107 having a load. Model look-up component 209 determines the impact of changing the first operating characteristic (the travel speed) on moving the center of gravity of machine 102 is small. On the other hand, model look-up component 209 determines the impact of changing the second operating characteristic (lowering the bucket) on moving the center of gravity of machine 102 is high. In other words, it determines that adjusting a travel speed of machine 102 will not have a large impact on the likely center of gravity of machine 102 at the position, while adjusting the height of movable element 107 will have a large impact on the likely center of gravity of machine 102 at the same position. In this example, the controllable angular position (e.g., height) of movable element 107 is assigned a stronger weighted value, indicating a large impact on likely machine stability, while the travel speed is assigned a lower weighted value, indicating a relatively small impact on likely machine stability (e.g., at least relative to the larger impact caused by controllable movement of movable element 107).

At block 408, criteria filtering component 211 filters the predicted operating characteristics to identify one or more characteristics for controllable restriction. For instance, criteria filtering component 211 identifies particular operating characteristics having strong (or large) weighted values, indicting a relatively large impact on machine stability at the position. Block 408 can include comparing the assigned weighted values to a threshold weighted value, and identifying particular operating characteristics having a weighted value that exceeds the threshold. The control signal for controlling the identified operating characteristics in a way that leads to instability are then filtered out of a list of all possible control signals for the operating characteristics. As such, criteria filtering component 211 identifies which types of machine control are most likely to cause instability at the position. In accordance with the example discussed above, criteria filtering component 211 would identify certain adjustments to the angular position of movable element 107 (e.g., a certain height) for controllable restriction.

At block 410, criteria filtering component 211 selects control signals for restricting machine control, based on the filtered operating characteristics. That is, criteria filtering component 211 selects control signals that machine 102 generates using control system 218. Machine 102 may be able to generate a wide variety of different control signals. Criteria filtering component 211 determines that, if machine 102 were to generate those selected control signals at the position, it would likely cause machine 102 to become unstable.

At block 412 restriction control signal generator 213 generates a restriction control signal that inhibits generation of the control signals selected at block 410. For instance, restriction control signal generator 213 outputs the restriction control signal to control signal generator 226 to restrict generation of control signals that control machine 102. The restriction control signal enables control signal generator 226 to generate control signals that do not correspond to the filtered-out list of operating characteristics. The restriction control signal prevents control signal generator 226 from generating the selected control signals, which correspond to the filtered-out list of operating characteristics that have been determined as likely to move the center of gravity of machine 102 outside of the stability limit.

At block 414, stability detection and control system 104 uses dynamic stability controller 262 to control machine 102 to not only restrict out certain control signals but to also generate positive control signals to avoid the unstable state at the position, based on the restriction control signal generated at block 412. For instance, block 414 includes providing an indication of the restriction signal to communication component 248, which communicates the indication to communication system 216 and control system 218. Further, controller 262 can automatically generate control signals to control the controllable subsystems to maintain stability (e.g., lower the bucket, reduce speed, control turning angle, etc.).

The figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Figure 5:
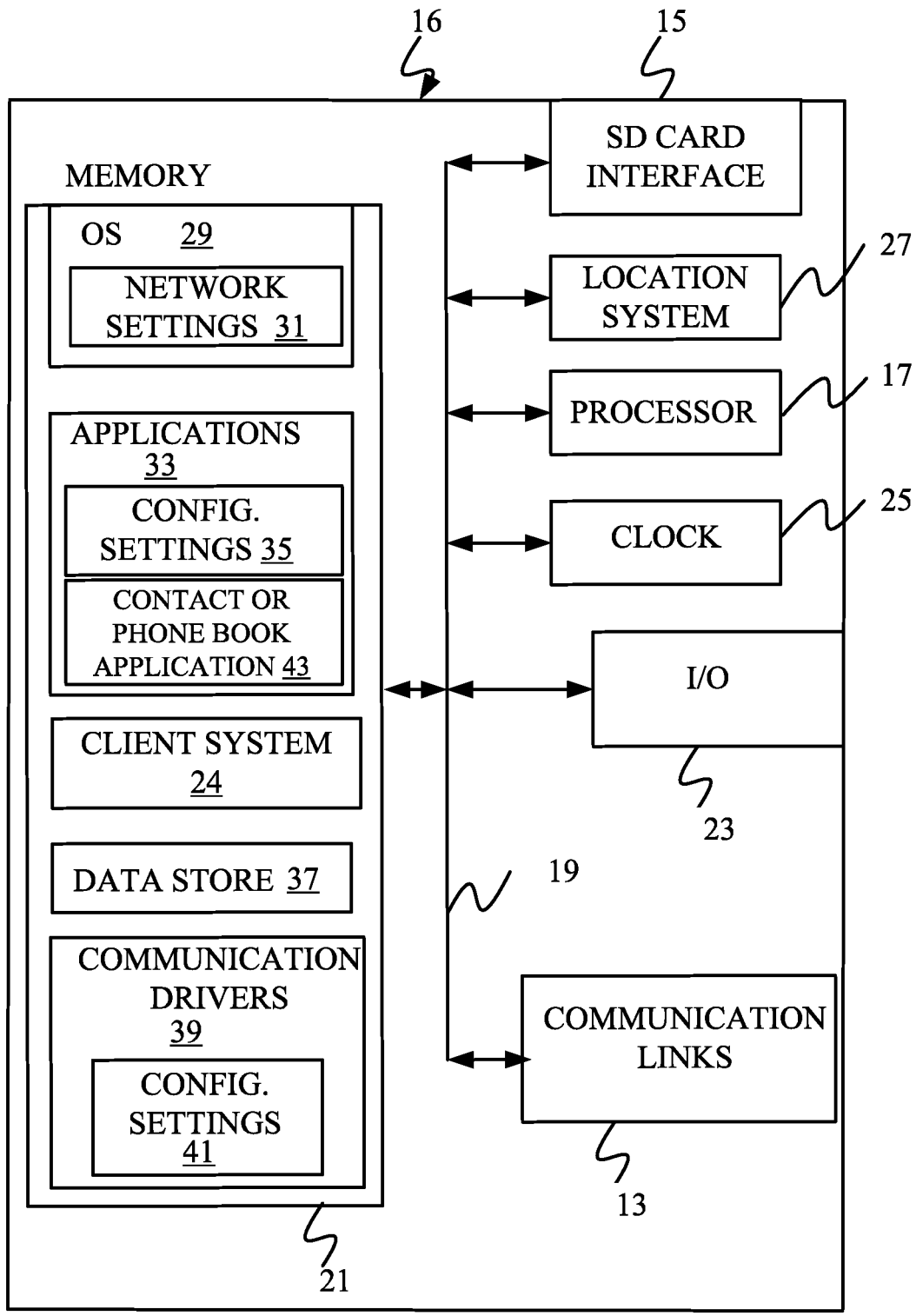
FIG. 5 is a simplified block diagram of one illustrative example of a handheld or mobile computing device in which the present system (or parts of it) can be deployed.
Figure 6:
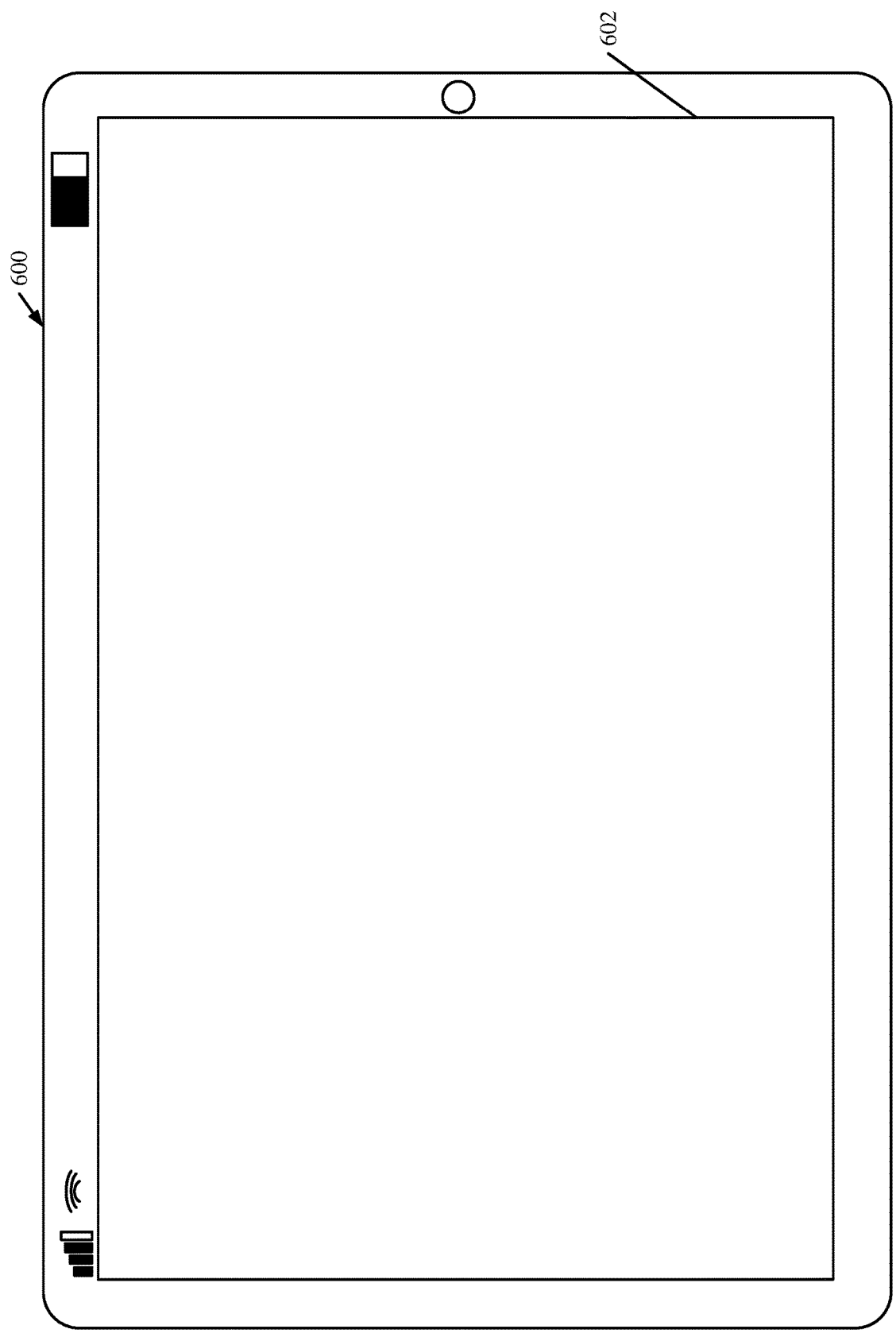
FIG. 6-7 show examples of mobile devices that can be used in the architectures shown in the previous figures.
Figure 7:
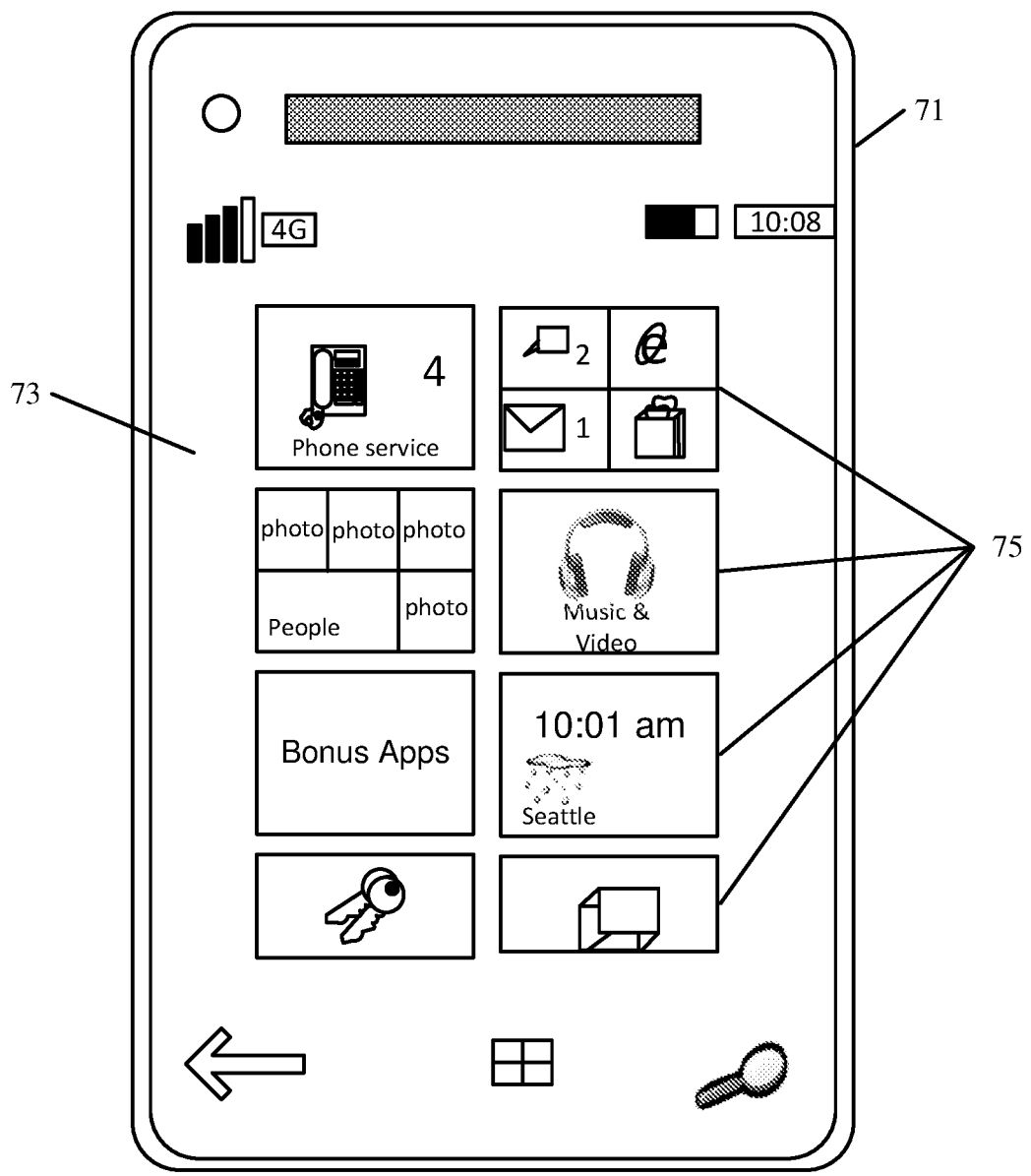

FIG. 5 is a simplified block diagram of one illustrative example of a handheld or mobile computing device that can be used as a user's or client's hand held device 16, in which the present system (or parts of it) can be deployed. For instance, a mobile device can be deployed as computing architecture 200 in the operator compartment of machine 102 or for use in generating, processing, or displaying the information discussed herein and in generating a control interface. FIGS. 6-7 are examples of handheld or mobile devices.

FIG. 5 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
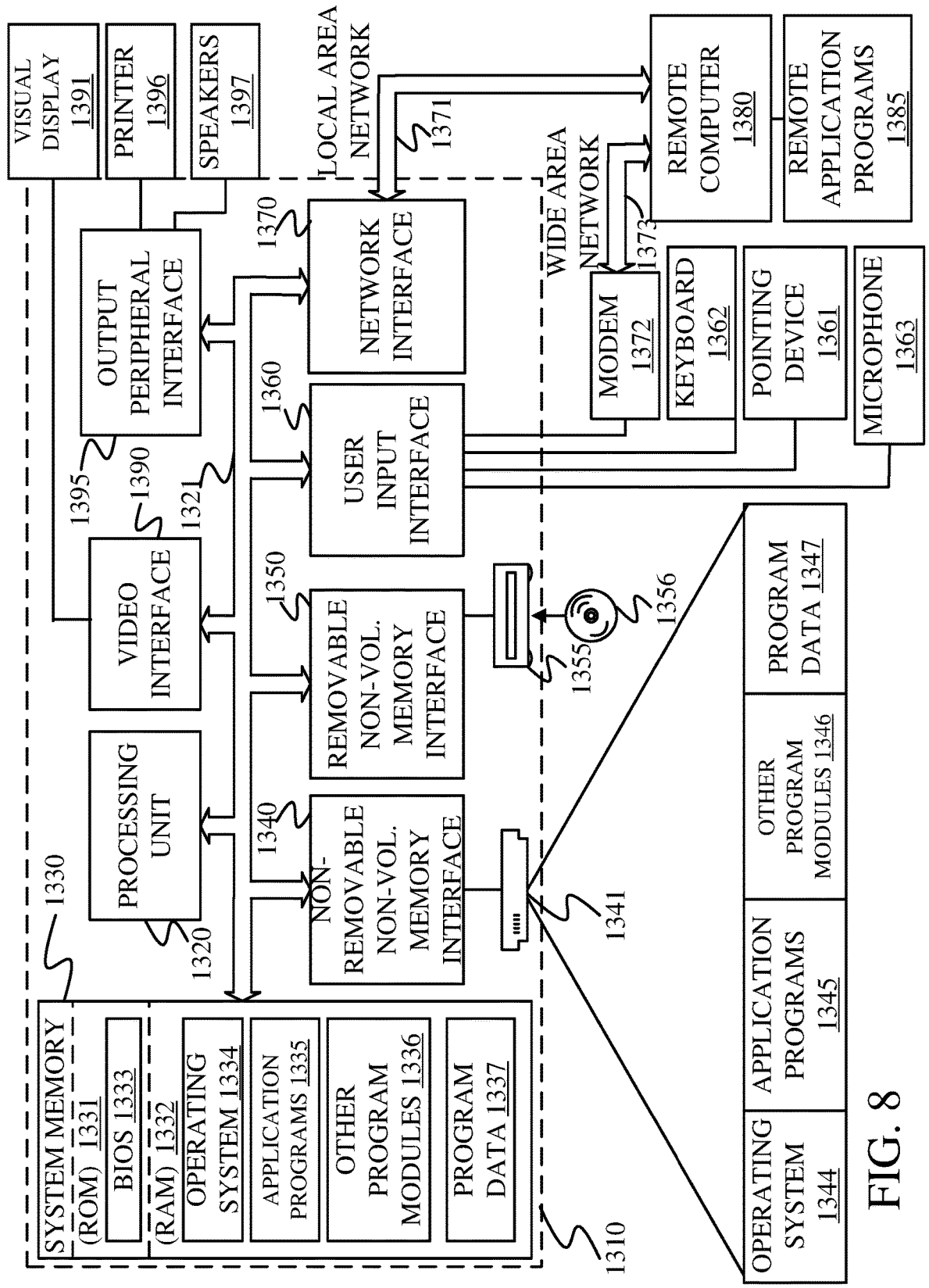
FIG. 8 is a block diagram showing one example of a computing environment that can be used in the architectures shown in the previous figures.

FIG. 8 is one example of a computing environment in which elements of FIG. 2, or parts of it, (for example) can be deployed. With reference to FIG. 8, an example system for implementing some embodiments includes a general-purpose computing device in the form of a computer 1310.

Components of computer 1310 may include, but are not limited to, a processing unit 1320 (which can comprise processors or servers from previous FIGS.), a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. Memory and programs described with respect to FIG. 2 can be deployed in corresponding portions of FIG. 8.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 8 illustrates operating system 1334, application programs 1335, other program modules 1336, and program data 1337.

The computer 1310 may also include other removable/non-removable volatile/nonvolatile computer storage media. By way of example only, FIG. 8 illustrates a hard disk drive 1341 that reads from or writes to non-removable, nonvolatile magnetic media, an optical disk drive 1355, and nonvolatile optical disk 1356. The hard disk drive 1341 is typically connected to the system bus 1321 through a non-removable memory interface such as interface 1340, and optical disk drive 1355 are typically connected to the system bus 1321 by a removable memory interface, such as interface 1350.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 1310. In FIG. 8, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite dish, scanner, or the like. These and other input devices are often connected to the processing unit 1320 through a user input interface 1360 that is coupled to the system bus, but may be connected by other interface and bus structures. A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections (such as a local area network—LAN, or wide area network WAN) to one or more remote computers, such as a remote computer 1380.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. In a networked environment, program modules may be stored in a remote memory storage device. FIG. 8 illustrates, for example, that remote application programs 1385 can reside on remote computer 1380.

It should also be noted that the different examples described herein can be combined in different ways. That is, parts of one or more examples can be combined with parts of one or more other examples. All of this is contemplated herein.

Example 1 is a mobile work machine, comprising:

a frame;

a set of ground engaging elements movably supported by the frame and driven by a power source to drive movement of the mobile work machine;

a moveable element movably supported by the frame to move relative to the frame;

an actuator coupled to the moveable element to controllably drive movement of the moveable element;

a control system that generates an actuator control signal, indicative of a commanded movement of the actuator, and provides the actuator control signal to the actuator to control the actuator to perform the commanded movement;

a terrain identifier configured to identify a characteristic of terrain in a geographic area around the mobile work machine; and a stability system, coupled to the control system, that determines whether the commanded movement will result in an unstable state of the mobile work machine based on the identified characteristic of the terrain in the geographic area around the mobile work machine and, if so, generates a restriction signal, restricting the commanded movement to avoid the unstable state.

Example 2 is the mobile work machine of any or all previous examples, wherein the stability system comprises:

a terrain detector configured to generate a map defining a plurality of grid sections that correspond to geographic locations in the geographic area around the mobile work machine, based on a terrain signal generated by the terrain identifier indicative of the identified terrain.

Example 3 is the mobile work machine of any or all previous examples, wherein the stability system comprises:

a machine configuration detector configured to detect a machine configuration in which the mobile machine is likely to be configured if positioned at a given one of the geographic locations.

Example 4 is the mobile work machine of any or all previous examples, wherein the machine configuration detector detects a likely load on the mobile work machine, based on the detected machine configuration.

Example 5 is the mobile work machine of any or all previous examples, wherein the stability system comprises:

stability detection logic configured to detect a center of gravity of the mobile work machine at the given geographic location, based on the likely load and the identified characteristic of the terrain.

Example 6 is the mobile work machine of any or all previous examples, wherein the stability detection logic detects the unstable state of the mobile work machine by determining whether the center of gravity of the mobile work machine is within a threshold area bounded by the ground engaging elements.

Example 7 is the mobile work machine of any or all previous examples, wherein the stability system comprises:

a dynamic stability controller that receives an indication from the stability detection logic, indicative of a determination that the center of gravity is not within the threshold area, and automatically restricts generation of the actuator control signal, based on the indication.

Example 8 is the mobile work machine of any or all previous examples, wherein the dynamic stability controller generates the restriction signal to restrict the commanded movement and prevent configuration of the mobile work machine in the machine configuration to avoid the unstable state.

Example 9 is the mobile work machine of any or all previous examples, wherein the dynamic stability controller comprises:

a model-look up component that generates a weighted value and assigns the weighted value to the commanded movement, wherein the weighted value is indicative of a degree of deviation, of the center of gravity from the threshold area, attributed to the commanded movement.

Example 10 is the mobile work machine of any or all previous examples, wherein the stability detection logic identifies a slope at a particular grid point in the map corresponding to the given geographic location, based on the terrain signal, and detects the center of gravity of the mobile work machine by detecting a likely elevation of at least one of the ground engaging elements relative to the frame, based on the slope.

Example 11 is the mobile work machine of any or all previous examples, wherein the stability detection logic detects the center of gravity based on the likely load on the mobile work machine relative to the likely elevation of the at least one ground engaging element.

Example 12 is a method of controlling a mobile machine comprising:

generating a control signal, indicative of a commanded operation of a controllable subsystem, to the controllable subsystem of the mobile machine to control the controllable subsystem to perform the commanded operation;

identifying a characteristic of terrain in a geographic area around the mobile work machine; and determining whether the commanded operation will result in an unstable state of the mobile work machine based on the identified characteristic of the terrain in the geographic area around the mobile work machine and, if so, generating a restriction signal that restricts the commanded operation to avoid the unstable state.

Example 13 is the method of any or all previous examples, wherein the controllable subsystem is a steering subsystem that controls the heading of the mobile machine and the commanded operation comprises a commanded turning angle of the steering subsystem.

Example 14 is the method of any or all previous examples, wherein the restriction signal restricts the angle at which the steering subsystem can turn the mobile machine.

Example 15 is the method of any or all previous examples, wherein the controllable subsystem is a propulsion subsystem that drives movement of the mobile machine and the commanded operation comprises a commanded speed of the propulsion subsystem.

Example 16 is the method of any or all previous examples, wherein the restriction signal restricts the speed at which the propulsion system can drive movement of the mobile machine.

Example 17 is the method of any or all previous examples, wherein the controllable subsystem is an actuator subsystem having an actuator that drives movement of a movable element movably mounted to the machine to position the movable element relative to the machine and the commanded operation comprises a commanded movement of the actuator to position the movable element.

Example 18 is the method of any or all previous examples, wherein the restriction signal restricts the movement of the actuator to restrict the position of the movable element to stay within a range of positions.

Example 19 is the method of any or all previous examples, wherein the restriction signal prevents the controllable subsystem from performing the commanded operation indicated by the control signal.

Example 20 is a mobile work machine, comprising:

a frame;

a ground engaging element movably supported by the frame and driven by a power source to drive movement of the mobile work machine;

a movable element movably supported by the frame to move relative to the frame;

an actuator coupled to the movable element to controllably drive movement of the movable element; and a stability control system that identifies a characteristic of terrain in a geographic area around the mobile work machine and determines if a commanded action of the actuator will result in an unstable state of the mobile work machine, based on the identified characteristic of the terrain in the geographic area around the mobile work machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
   a frame;
   a set of ground engaging elements movably supported b the frame and driven by a power source to drive movement of the mobile work machine;
   a moveable element movably supported by the frame to move relative to the frame;
   an actuator coupled to the moveable element to controllably drive movement of the moveable element;
   a control system that generates an actuator control signal, indicative of a commanded movement of the actuator, and provides the actuator control signal to the actuator to control the actuator to perform the commanded movement;
   a terrain identifier configured to identify a characteristic of terrain in a geographic area around the periphery of the mobile work machine; and
   a stability system, coupled to the control system, that determines whether the commanded movement will result in an unstable state of the mobile work machine based on the identified characteristic of the terrain in the geographic area around the periphery of the mobile work machine and, if so, generates a restriction signal, restricting the commanded movement to avoid the unstable state.

2. The mobile work machine of claim 1, wherein the stability system comprises:
   a terrain detector configured to generate a map defining a plurality of grid sections that correspond to geographic locations in the geographic area around the periphery of the mobile work machine, based on a terrain signal generated by the terrain identifier indicative of the identified terrain.

3. The mobile work machine of claim 2, wherein the stability system comprises:
   a machine configuration detector configured to detect a machine configuration in which the mobile machine is likely to be configured if positioned at a given one of the geographic locations.

4. The mobile work machine of claim 3, wherein the machine configuration detector detects a likely load on the mobile work machine, based on the detected machine configuration.

5. The mobile work machine of claim 4, wherein the stability system comprises:
   stability detection logic, configured to detect a center of gravity of the mobile work machine at the given geographic location, based on the likely load and the identified characteristic of the terrain.

6. The mobile work machine of claim 5, wherein the stability detection logic detects the unstable state of the mobile work machine by determining whether the center of gravity of the mobile work machine is within a threshold area bounded by the ground engaging elements.

7. The mobile work machine of claim 6, wherein the stability system comprises:
   a dynamic stability controller that receives art indication from the stability detection logic, indicative of a determination that the center of gravity is not within the threshold area, and automatically restricts generation of the actuator control signal, based on the indication.

8. The mobile work machine of claim 7, wherein the dynamic stability controller generates the restriction signal to restrict the commanded movement and prevent configuration of the mobile work machine in the machine configuration to avoid the unstable state.

9. The mobile work machine of claim 8, wherein the dynamic stability controller comprises:
   a model-look up component that generates a weighted value and assigns the weighted value to the commanded movement, wherein the weighted value is indicative of a degree of deviation, of the center of gravity from the threshold area, attributed to the commanded movement.

10. The mobile work machine of claim 5, wherein the stability detection logic identities a slope at a particular grid point in the map corresponding to the given geographic location, based on the terrain signal, and detects the center of gravity of the mobile work machine by detecting a likely elevation of at least one of the ground engaging elements relative to the frame, based on the slope.

11. The mobile work machine of claim 10, wherein the stability detection logic detects the center of gravity based on the likely load on the mobile work machine relative to the likely elevation, of the at least one ground engaging element.

12. A method of controlling a mobile machine comprising;
   generating a control signal, indicative of a commanded operation of a controllable subsystem, to the controllable subsystem of the mobile machine to control the controllable subsystem to perform the commanded operation;
   identifying, with a terrain identifier of the mobile machine, a characteristic of terrain in a geographic area around the periphery of the mobile machine; and
   determining whether the commanded operation will result in an unstable state of the mobile machine based on the identified characteristic of the terrain in the geographic area around the periphery of the mobile machine and, if so, generating a restriction signal that restricts the commanded operation to avoid the unstable state.

13. The method of claim 12, wherein the controllable subsystem is a steering subsystem that controls the heading of the mobile machine and the commanded operation comprises a commanded turning angle of the steering subsystem.

14. The method of claim 13, wherein the restriction signal restricts the angle at which the steering subsystem can turn the mobile machine.

15. The method of claim 12, wherein the controllable subsystem is a propulsion subsystem that drives movement of the mobile machine and the commanded operation comprises a commanded speed of the propulsion subsystem.

16. The method of claim 15, wherein the restriction signal restricts the speed at which the propulsion system can drive movement of the mobile machine.

17. The method of claim 12, wherein the controllable subsystem is an actuator subsystem having an actuator that drives movement of a movable element movably mounted to the machine to position the movable element relative to the machine and the commanded operation comprises a commanded movement of the actuator to position the movable element.

18. The method of claim 17, wherein the restriction signal restricts the movement of the actuator to restrict the position of the movable element to stay within a range of positions.

19. The method of claim 12, wherein the restriction signal prevents the controllable subsystem from performing the commanded operation indicated by the control signal.

20. A mobile work machine, comprising;
a frame;
a ground engaging element movably supported by the frame and driven by a power source to drive movement of the mobile work machine;
a movable element movably supported by the frame to move relative to the frame;
an actuator coupled to the movable element to controllably drive movement of the movable element; and
a stability control system that identifies a characteristic of terrain in a geographic area around the periphery of the mobile work machine and determines if a commanded action of the actuator will result in an unstable state of the mobile work machine, based on the identified characteristic of the terrain in the geographic area around the periphery of the mobile work machine.

* * * * *